(12) United States Patent
Horita

(10) Patent No.: US 9,335,622 B2
(45) Date of Patent: May 10, 2016

(54) INFORMATION PROCESSING DEVICE AND INFORMATION PROCESSING SYSTEM

(75) Inventor: Shinichi Horita, Osaka (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 595 days.

(21) Appl. No.: 13/642,732

(22) PCT Filed: Apr. 8, 2011

(86) PCT No.: PCT/JP2011/058915
§ 371 (c)(1),
(2), (4) Date: Oct. 22, 2012

(87) PCT Pub. No.: WO2011/132552
PCT Pub. Date: Oct. 27, 2011

(65) Prior Publication Data
US 2013/0038700 A1    Feb. 14, 2013

(30) Foreign Application Priority Data
Apr. 22, 2010   (JP) .................................. 2010-098669

(51) Int. Cl.
*G03B 35/08* (2006.01)
*G02B 7/36* (2006.01)
*H04N 13/02* (2006.01)

(52) U.S. Cl.
CPC ... *G03B 35/08* (2013.01); *G02B 7/36* (2013.01); *H04N 13/0239* (2013.01); *H04N 13/0246* (2013.01)

(58) Field of Classification Search
CPC .................................. G02B 7/36; G03B 35/08
USPC .......................................................... 348/47
See application file for complete search history.

(56) References Cited

U.S. PATENT DOCUMENTS 6,122,112 A      9/2000  Oono et al.
6,864,910 B1 *   3/2005  Ogino et al. .................... 348/42

(Continued)

FOREIGN PATENT DOCUMENTS

JP    10320558 A  * 12/1998  ................ G06T 7/00
JP    11-30740        2/1999

(Continued)

OTHER PUBLICATIONS

International Search Report in International Application No. PCT/JP2011/058915, mailed Jul. 5, 2011, 2 pages.

(Continued)

*Primary Examiner* — Tat Chio
*Assistant Examiner* — Fabio Lima
(74) *Attorney, Agent, or Firm* — Brinks Gilson & Lione

(57) ABSTRACT

An object is to obtain a focal length of an imaging device with ease at a high speed. In order to achieve the object concerned, an information processing device is configured to include: an image obtaining unit that, with regard to an object in a state where a spatial relationship with an imaging system is kept, obtains a standard image in which the object is imaged by an imaging condition having a known standard focal length, and a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image.

4 Claims, 26 Drawing Sheets

(56) References Cited

U.S. PATENT DOCUMENTS

| | | |
|---|---|---|
| 7,423,666 B2 | 9/2008 | Sakakibara et al. |
| 7,936,384 B2 * | 5/2011 | Sawachi ............... 348/240.1 |
| 2004/0066454 A1 * | 4/2004 | Otani et al. ............ 348/188 |
| 2006/0187312 A1 * | 8/2006 | Labaziewicz et al. ..... 348/218.1 |
| 2007/0146503 A1 * | 6/2007 | Shiraki .................. 348/231.3 |
| 2011/0026014 A1 * | 2/2011 | Mack et al. ............. 356/124 |

FOREIGN PATENT DOCUMENTS

| | | |
|---|---|---|
| JP | 2002-354506 | 12/2002 |
| JP | 2004-037270 | 2/2004 |
| JP | 2005-210217 | 8/2005 |
| JP | 2005-269121 | 9/2005 |
| JP | 2006-093860 A | 4/2006 |
| JP | 2009-124204 | 4/2009 |

OTHER PUBLICATIONS

Zhengyou Zhang, "A Flexible New Technique for Camera Calibration," IEEE Transactions on Pattern Analysis and Machine Intelligence, vol. 22, No. 11, dated Nov. 2000, pp. 1330-1334.

International Search Report in International Application No. PCT/JP2011/058915, mailed Jul. 5, 2011, 1 page.

* cited by examiner

F I G. 4
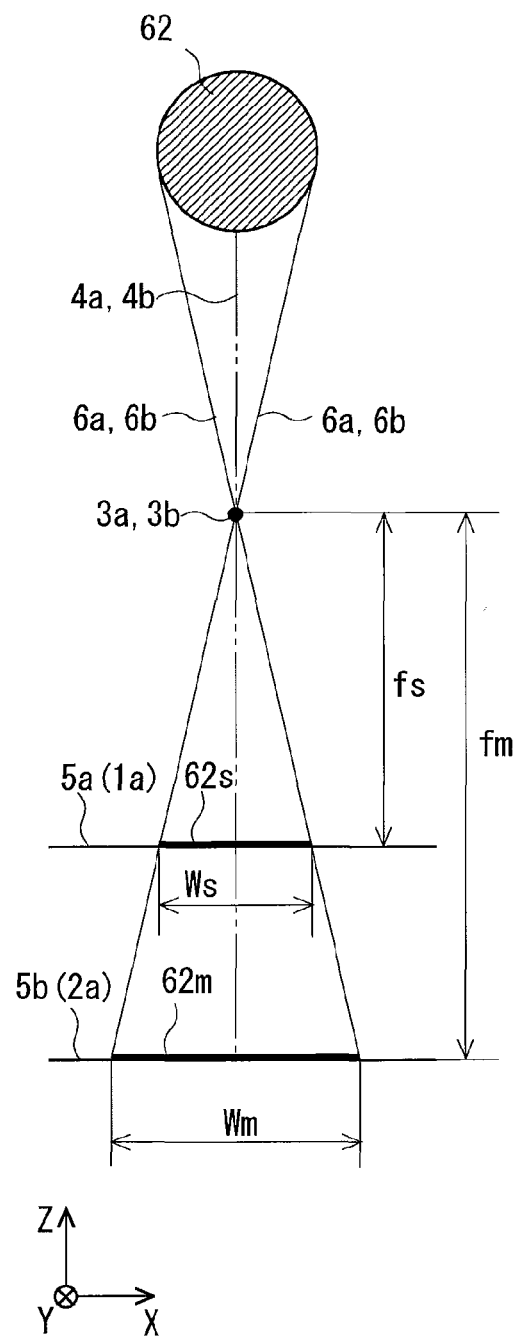

F I G. 1 1
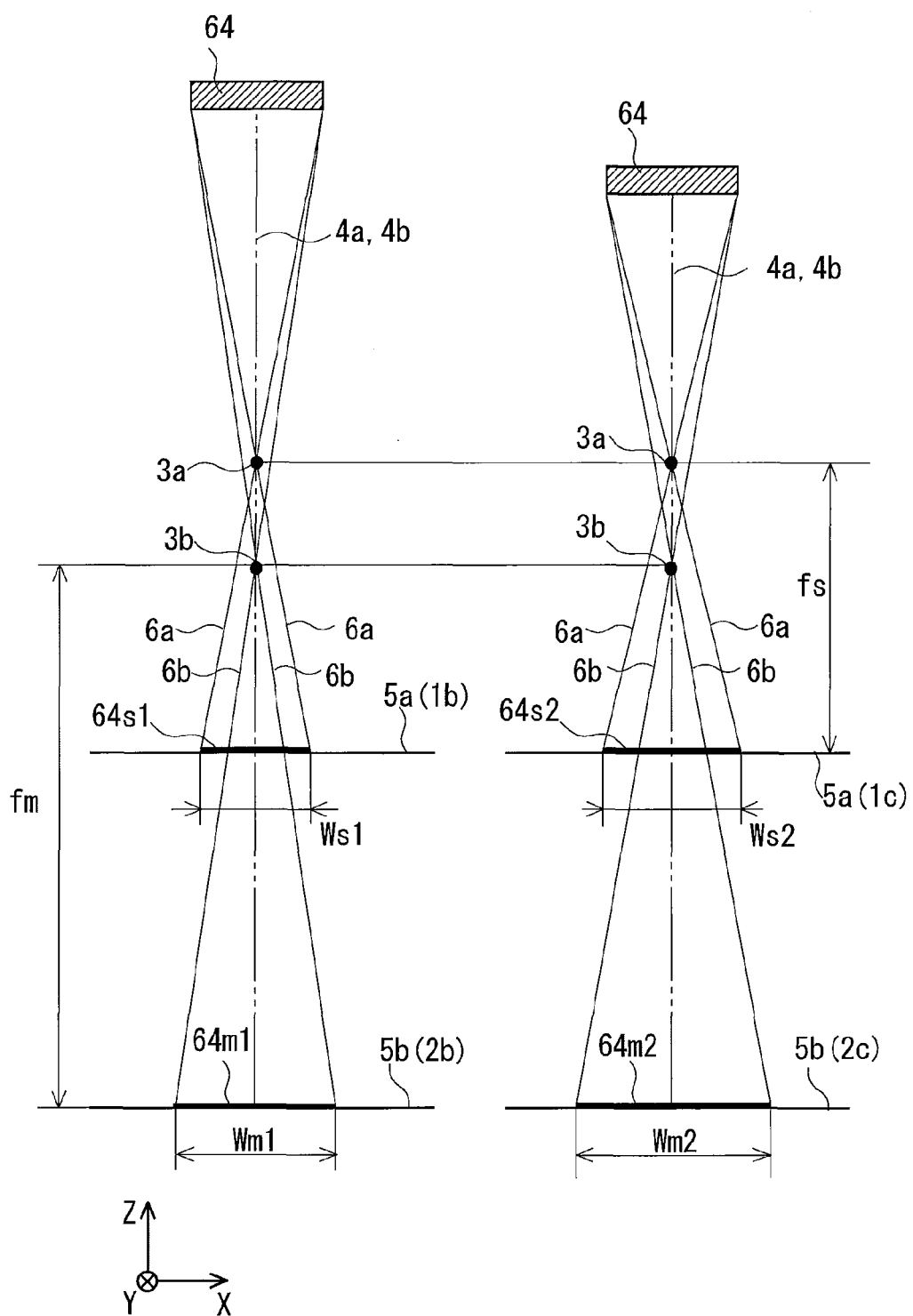

F I G. 1 4
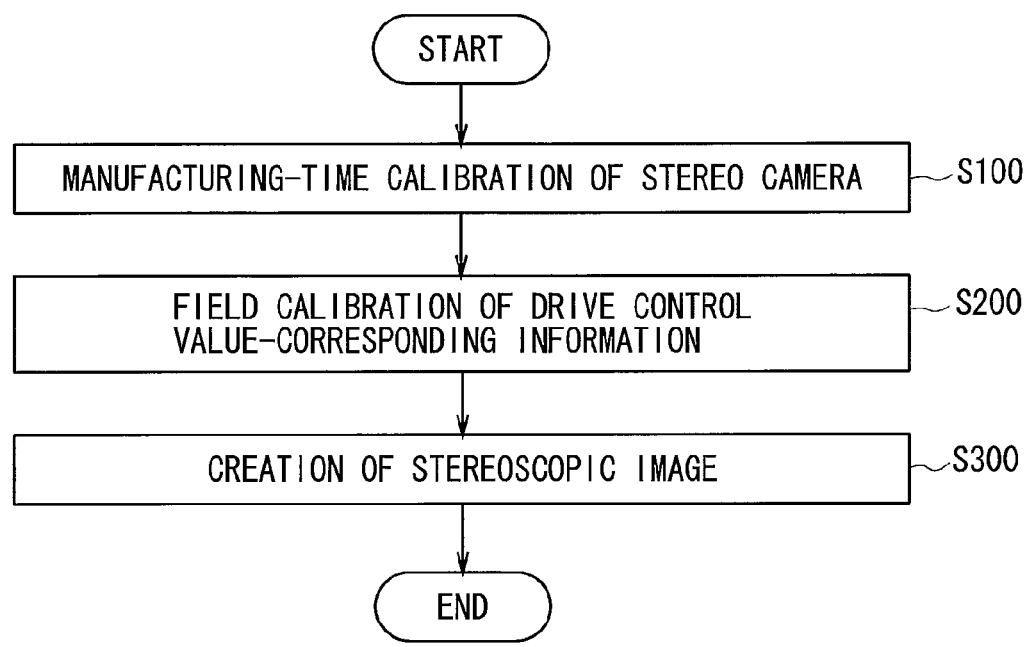

INFORMATION PROCESSING DEVICE AND INFORMATION PROCESSING SYSTEM

This application is a National Stage application of International Application No. PCT/JP2011/058915, filed Apr. 8, 2011.

TECHNICAL FIELD

The present invention relates to a stereo camera imaging images to be served for creation of a stereoscopic image set.

BACKGROUND ART

For a stereo camera capable of imaging stereo images from a plurality of different viewpoints, various ones have been proposed, and the stereo images in which imaging ranges are equal to each other are adopted for a stereoscopic display image and the like.

For example, a stereo camera of Patent Literature 1 includes: a focal length-variable (zoom-drivable) imaging system: and a focal length-fixed (unifocal) imaging system, and can create the stereo images, in which the imaging ranges are equal to each other, even from two images different in imaging magnification by appropriately using number reduction processing, pattern matching processing and the like.

PRIOR PATENT DOCUMENT

Patent Document

Patent Document 1: Japanese Patent Application Laid-Open No. 2005-210217

SUMMARY OF THE INVENTION

Problems to be Solved by the Invention

However, in the stereo camera of Patent Document 1, a focal length of the focal length-variable imaging system is not obtained, and accordingly, there are problems that three-dimensional shape data cannot be created from such images individually imaged by the respective imaging systems of the stereo camera, and that various pieces of processing, which are based on the three-dimensional shape data concerned, cannot be performed.

The present invention has been made in order to solve such problems as described above. It is an object of the present invention to provide a technology capable of obtaining the focal length of the focal length-variable imaging device easily at a high speed.

Means for Solving the Problems

In order to solve the foregoing problems, an information processing device according to a third aspect includes: an image obtaining unit that, with regard to an object in a state where a spatial relationship with an imaging system is kept, obtains (a) a standard image in which the object is imaged by an imaging condition having a known standard focal length, and (b) a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image, wherein the standard image includes first and second standard images obtained by individually imaging the object at different imaging distances, and meanwhile, the reference image includes first and second reference images obtained by individually imaging the object at the same imaging distances as the imaging distances in the first and second standard images.

An information processing device according to a fourth aspect includes: an image obtaining unit that, with regard to an object in a state where a spatial relationship with an imaging system is kept, obtains (a) a standard image in which the object is imaged by an imaging condition having a known standard focal length, and (b) a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image, wherein the object has first and second objects arranged at different imaging distances and having the same size, the standard image is an image obtained by imaging the first and second objects simultaneously, and the reference image is an image obtained by imaging the first and second objects simultaneously.

An information processing device according to a fifth aspect includes: an image obtaining unit that, with regard to an object in a state where a spatial relationship with an imaging system is kept, obtains (a) a standard image in which the object is imaged by an imaging condition having a known standard focal length, and (b) a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image, wherein the standard image is a single standard image in which the object is imaged, meanwhile, the reference image is a single reference image in which the object is imaged, and the focal length obtaining unit performs the arithmetic operation processing based on the standard focal length, on image sizes of a predetermined portion of the object in the standard image and the reference image, on an actual size of the object, and on a deviation amount between an optical center position of an imaging device in an optical axis direction, the imaging device imaging the standard image, and an optical center position of an imaging optical system of an imaging device in an optical axis direction, the imaging device imaging the reference image.

An information processing device according to a sixth aspect includes: an image obtaining unit that, with regard to an object in a state where a spatial relationship with an imaging system is kept, obtains (a) a standard image in which the object is imaged by an imaging condition having a known standard focal length, and (b) a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image, wherein the object has first and second objects, the standard image includes first and second standard images obtained by imaging the first and second objects, respectively, meanwhile, the reference image includes first and second reference images obtained by imaging the first and second objects, respectively, and the focal length obtaining unit performs the arithmetic operation processing based on image sizes of a first portion of the first object in the first standard image and the first reference image, on image sizes of a second portion of the second object in the second standard image and the second reference image, and on respective actual sizes of the first and second objects.

An information processing device according to a seventh aspect includes: an image obtaining unit that, with regard to an object in a state where a spatial relationship with an imaging system is kept, obtains (a) a standard image in which the object is imaged by an imaging condition having a known standard focal length, and (b) a reference image in which the object is imaged by an imaging condition having an unknown reference focal length; and a focal length obtaining unit that obtains a value of the reference focal length by performing arithmetic operation processing for scaling a value of the standard focal length by using information of image sizes of the object in the standard image and the reference image, wherein the object has first and second objects, the standard image is an image obtained by imaging the first and second objects simultaneously, and the reference image is an image obtained by imaging the first and second objects simultaneously, and the focal length obtaining unit performs the arithmetic operation processing based on image sizes of a first portion of the first object in the standard image and the reference image, on image sizes of a second portion of the second object in the standard image and the reference image, and on respective actual sizes of the first object and the second object.

The information processing device according to an eighth aspect is the information processing device according to the sixth aspect, wherein the focal length obtaining unit further obtains a deviation amount between an optical center position of an imaging optical system of an imaging device in an optical axis direction, the imaging device imaging the standard image, and an optical center position of an imaging optical system of an imaging device in an optical axis direction, the imaging device imaging the reference image, based on image sizes of a first portion of the first object in the first standard image and the first reference image, on image sizes of a second portion of the second object in the second standard image and the second reference image, and on respective actual sizes of the first object and the second object.

An information processing system according to a ninth aspect is an information processing system having: (A) the information processing device according to the third aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image based on imaging by the first imaging device, and in addition, obtains the reference image based on imaging by the second imaging device.

An information processing system according to a tenth aspect is an information processing system having: (A) the information processing device according to the third aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image and the reference image from the second imaging device.

An information processing system according to a fourteenth aspect is the information processing system according to the ninth aspects, wherein a three-dimensionalization parameter for obtaining, from stereo images of a subject imaged by the stereo camera, a three-dimensional shape of the subject includes: a first camera parameter regarding the first imaging device; and a second camera parameter regarding the second imaging device, and a parameter obtaining unit that obtains the second camera parameter based on the reference focal length is further provided.

An information processing system according to a twentieth aspect is an information processing system having: (A) the information processing device according to the fourth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image based on imaging by the first imaging device, and in addition, obtains the reference image based on imaging by the second imaging device.

An information processing system according to a twenty-first aspect is an information processing system having: (A) the information processing device according to the fourth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image and the reference image from the second imaging device.

An information processing system according to a twenty-second aspect is the information processing system according to the twentieth aspect, wherein a three-dimensionalization parameter for obtaining, from stereo images of a subject imaged by the stereo camera, a three-dimensional shape of the subject includes: a first camera parameter regarding the first imaging device; and a second camera parameter regarding the second imaging device, and a parameter obtaining unit that obtains the second camera parameter based on the reference focal length is further provided.

An information processing system according to a twenty-third aspect is an information processing system having: (A) the information processing device according to the fifth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image based on imaging by the first imaging device, and in addition, obtains the reference image based on imaging by the second imaging device.

An information processing system according to a twenty-fourth aspect is an information processing system having: (A) the information processing device according to the fifth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image and the reference image from the second imaging device.

An information processing system according to a twenty-fifth aspect is the information processing system according to the twenty-third aspect, wherein a three-dimensionalization parameter for obtaining, from stereo images of a subject imaged by the stereo camera, a three-dimensional shape of the subject includes: a first camera parameter regarding the first imaging device; and a second camera parameter regarding the second imaging device, and a parameter obtaining unit that obtains the second camera parameter based on the reference focal length is further provided.

An information processing system according to a twenty-sixth aspect is an information processing system having: (A) the information processing device according to the sixth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image based on imaging by the first imaging device, and in addition, obtains the reference image based on imaging by the second imaging device.

An information processing system according to a twenty-seventh aspect is an information processing system having: (A) the information processing device according to the sixth aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image and the reference image from the second imaging device.

An information processing system according to a twenty-eighth aspect is the information processing system according to the twenty-sixth aspect, wherein a three-dimensionalization parameter for obtaining, from stereo images of a subject imaged by the stereo camera, a three-dimensional shape of the subject includes: a first camera parameter regarding the first imaging device; and a second camera parameter regarding the second imaging device, and a parameter obtaining unit that obtains the second camera parameter based on the reference focal length is further provided.

An information processing system according to a twenty-ninth aspect is an information processing system having: (A) the information processing device according to the seventh aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image based on imaging by the first imaging device, and in addition, obtains the reference image based on imaging by the second imaging device.

An information processing system according to a thirtieth aspect is an information processing system having: (A) the information processing device according to the seventh aspect; and (B) a stereo camera including a first imaging device and a second imaging device, the first imaging device including a first imaging optical system with a fixed focal length, and the second imaging device including a second imaging optical system with a variable focal length, wherein the image obtaining unit obtains the standard image and the reference image from the second imaging device.

An information processing system according to a thirty-first aspect is the information processing system according to the twenty-sixth aspect, wherein a three-dimensionalization parameter for obtaining, from stereo images of a subject imaged by the stereo camera, a three-dimensional shape of the subject includes: a first camera parameter regarding the first imaging device; and a second camera parameter regarding the second imaging device, and a parameter obtaining unit that obtains the second camera parameter based on the reference focal length is further provided.

Even by the invention according to any of the third to seventh aspects, arithmetic operation processing for scaling the value of the standard focal length is performed by using the information of the image sizes of the subject in the standard image and the reference image, whereby the value of the reference focal length can be obtained easily at a high speed, and a calibration frequency of the stereo camera at a using site thereof can be enhanced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view explaining an example of obtainment of data for field calibration of a focal length.

FIG. 11 is a view explaining an example of the obtainment of the data for the field calibration of the focal length.

FIG. 14 is a view showing an example of an operation flow from calibration to creation of a stereoscopic image in the information processing system according to the embodiment.

EMBODIMENT FOR CARRYING OUT THE INVENTION

Regarding Embodiment

<○ Regarding Information Processing System 100A:>

Figure 1:
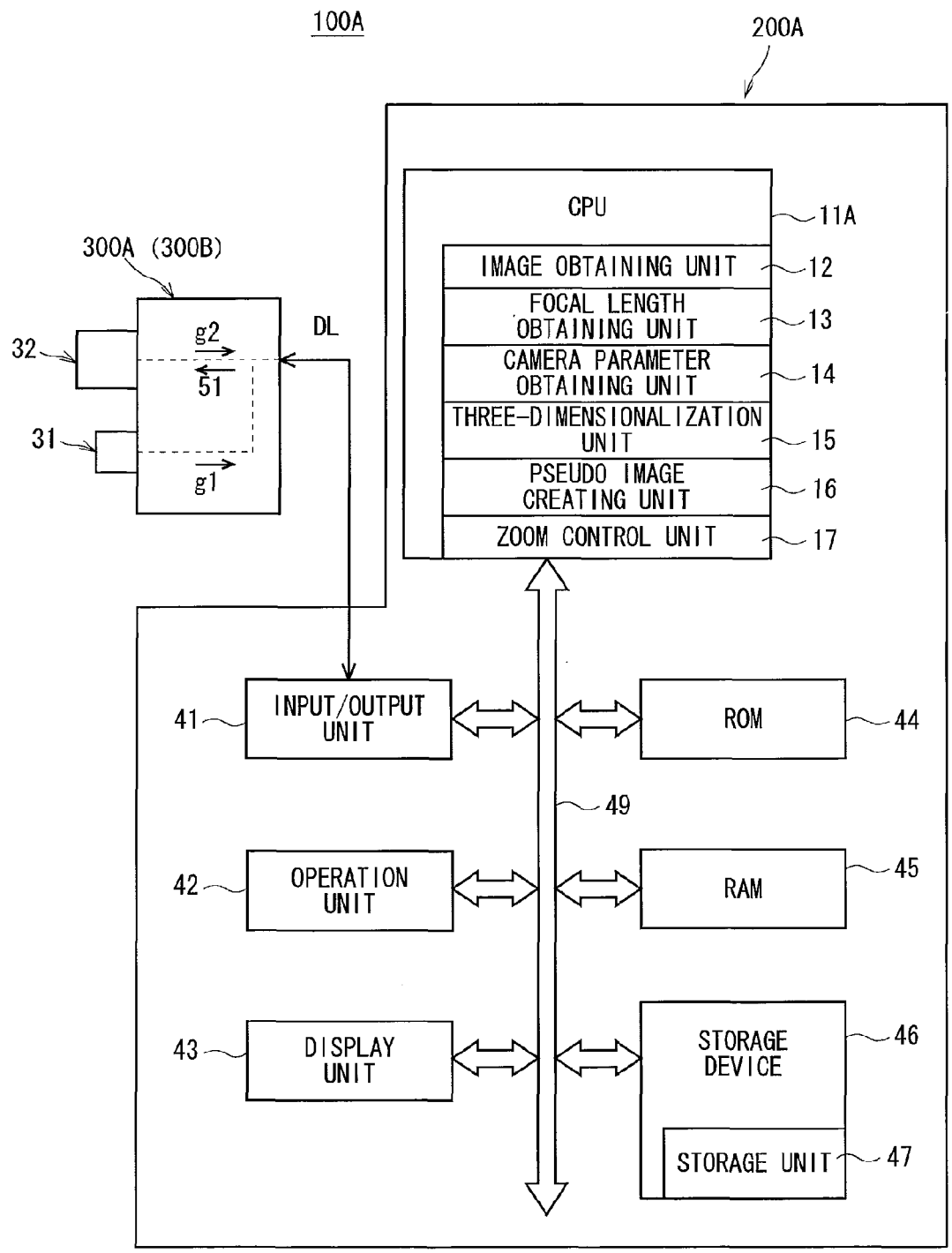
FIG. 1 is a block diagram illustrating a main configuration of an information processing system according to an embodiment.

FIG. 1 is a block diagram illustrating a main configuration of an information processing system 100A according to an embodiment.

As shown in FIG. 1, the information processing system 100A is composed by mainly including: a stereo camera 300A (or 300B); and an information processing device 200A.

The stereo cameras 300A and 300B are composed by mainly including: unifocal cameras (also referred to as "first cameras") 31 including focal length-fixed imaging optical systems; and zoom cameras (also referred to as "second cameras") 32 including focal length-variable imaging optical systems. A first image g1 and a second image g2, in which the unifocal camera 31 and zoom camera 32 of the stereo camera 300A (300B) placed at one viewpoint individually image a subject, are supplied to the information processing device 200A.

First, the information processing device 200A creates distance information 52 (FIG. 2), which expresses a three-dimensional shape of the subject imaged by the stereo camera 300A (300B), by a principle of triangulation from the first image g1 and the second image g2 by using three-dimensionalization parameters calibrated in advance and stored in a storage device 46 (FIG. 1).

The information processing device 200A obtains a correspondence relationship between an image to be imaged by the virtual camera from another viewpoint concerned and the second image g2 as a high-definition subject image imaged by the zoom camera 32 based on the distance information 52, information of a position and attitude of a virtual camera to be placed at another viewpoint different from the first viewpoint, and imaging parameters of the virtual camera and the zoom camera 32.

The information processing device 200A converts the second image g2 based on the correspondence relationship, thereby creates a pseudo image 53 (FIG. 2) corresponding to the image when the virtual camera concerned images the subject from another viewpoint, and displays the second image g2 and the pseudo image 53 on a stereoscopic display unit 43 as stereo images which compose a stereoscopic image set.

By the above-mentioned operations, the information processing system 100A realizes a stereoscopic image display system when the subject is stereo-viewed from a plurality of viewpoints including a viewpoint from which the subject is not measured.

The imaging optical system of the zoom camera 32 has a zoom drive mechanism, and accordingly, the three-dimensionalization parameters thereof are changed with time. In order that the pseudo image 53 with high quality can be obtained, it is necessary to keep the values of the three-dimensionalization parameters of the stereo camera 300A (300B) at an accurate value. In the information processing system 100A, the three-dimensionalization parameters can be calibrated at a high speed based on easily obtainable image data at an imaging site of the subject.

Note that the calibration at the imaging side is also referred to as "field calibration", and calibration in a manufacturing process of the stereo camera 300A is also referred to as "manufacturing time calibration".

A description is made below of configurations and operations of the respective functional units of the information processing system 100A, and in addition, the field calibration, the manufacturing time calibration and the like.

<○ Configuration and Operation of Stereo Camera 300A>

Figure 3:
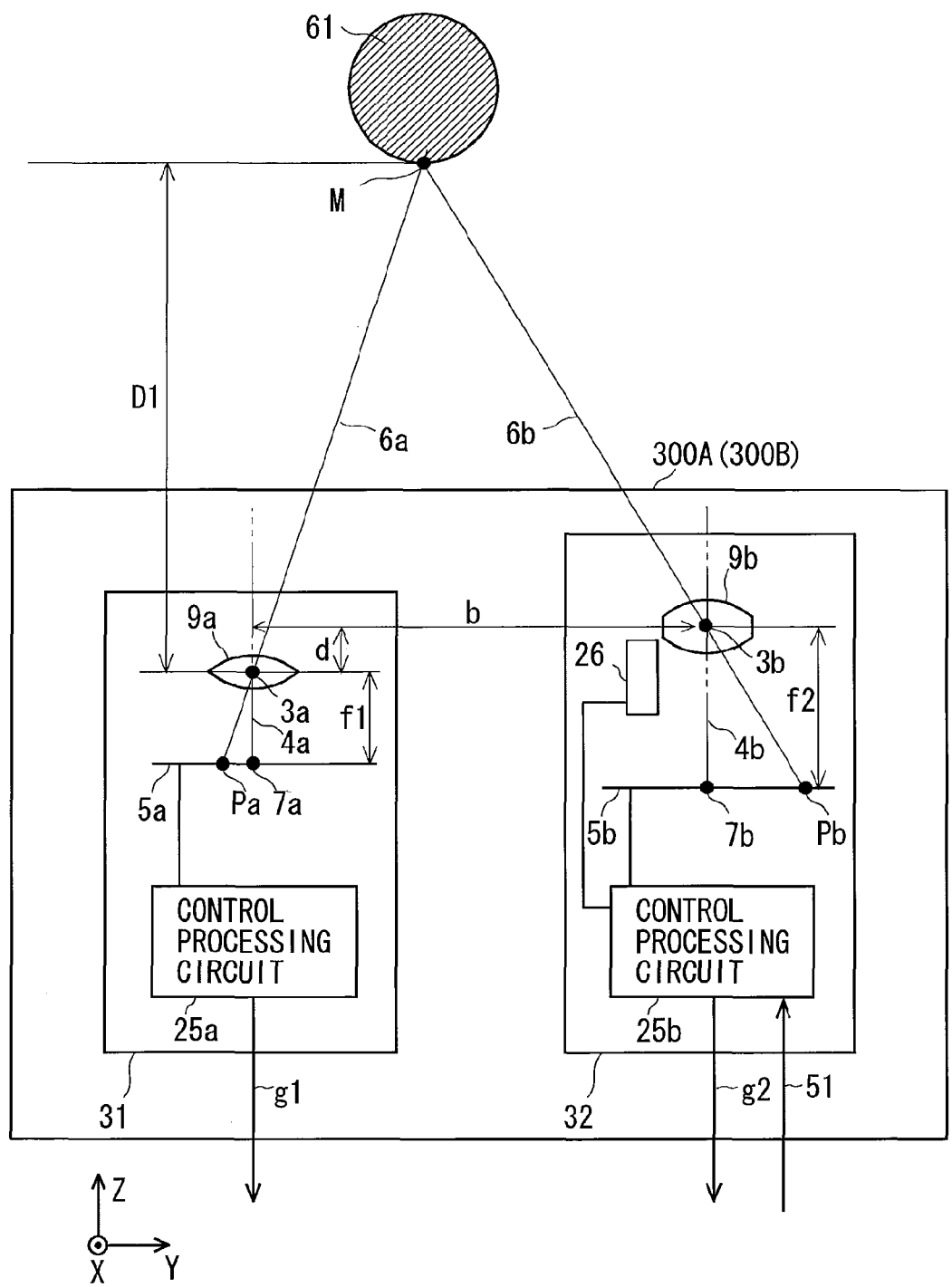
FIG. 3 is a block diagram illustrating a functional configuration of a stereo camera according to the embodiment.

FIG. 3 is a block diagram illustrating a functional configuration of the stereo camera 300A according to the embodiment. Note that, in the drawings of this application, coordinate axes are provided as appropriate in the drawings for explanation.

As shown in FIG. 3, the stereo camera 300A is composed by mainly including: the unifocal camera 31 as a camera including a focal length-fixed imaging optical system 9a; and a zoom camera 32 as a camera including a focal length-variable imaging optical system 9b.

The unifocal camera 31 is composed by mainly including: an imaging element 5a; and a control processing circuit 25a; as well as the imaging optical system 9a, and the zoom camera 32 is composed by mainly including an imaging element 5b; a control processing circuit 25b; and a drive mechanism 26; as well as the imaging optical system 9b.

The stereo camera 300A images light from a subject 61 by the unifocal camera 31 and the zoom camera 32, obtains the first image g1 and the second image g2, which compose the stereo images, and supplies the first image g1 and the second image g2 to the information processing device 200A.

The imaging optical system 9a is an optical system, which is composed by mainly including: a focal length-fixed lens:

and a lens barrel (not shown) that supports the lens, and forms an image of the subject 61 on the imaging element 5a.

The imaging optical system 9b is an optical system, which is composed by mainly including: a focal length-variable lens: and a lens barrel (not shown) that supports the lens, and forms the image of the subject 61 on the imaging element 5b, and is composed so that a focal length f2 of the imaging optical system 9b is changeable in such a manner that an optical state of the imaging optical system 9b is changed by the drive mechanism 26.

An image of an object point M of the subject 61 is formed as image points Pa and Pb respectively on the imaging elements 5a and 5b along principal rays 6a and 6b, which pass through optical centers 3a and 3b, respectively.

In usual, the optical centers 3a and 3b are principal points of the imaging optical system; however, for example, in the case where a telecentric optical system is adopted as the imaging optical system, focal points of the imaging optical system usually become the optical centers.

Image center positions 7a and 7b of the unifocal camera 31 and the zoom camera 32 are an intersection of the imaging element 5a and an optical axis 4a and an intersection of the imaging element 5b and an optical axis 4b, respectively, and moreover, a base length b between the imaging optical systems 9a and 9b is a distance between the optical axis 4a and the optical axis 4b.

A distance between the imaging optical system 9a and the imaging element 5a is a focal length f1 of the imaging optical system 9a, and a value of the focal length f1 is a known fixed value (constant).

Moreover, a distance between the imaging optical system 9b and the imaging element 5b is the focal length f2 of the imaging optical system 9b, and the focal length f2 is a variable focal length that varies in response to an operation that the drive mechanism 26 varies a state of the imaging optical system 9b.

Note that three-dimensionalization processing, which is based on the principle of the triangulation using the three-dimensionalization parameters related to the stereo camera 300, such as a difference (parallax) between a coordinate of the image point Pa on the imaging element 5a and a coordinate of the image point Pb on the imaging element 5b, the base length b, the focal length f1 and the focal length f2, is performed in the information processing device 200A, whereby distance information (also referred to as "three-dimensional coordinates") of an imaging distance D1 of the object point M and of others are obtained.

Here, with regard to the stereo camera 300A, the respective optical axes 4a and 4b of the imaging optical systems 9a and 9b are parallel to each other or substantially parallel to each other.

Moreover, in order that corresponding point search processing between the first image g1 and the second image g2 can be performed with ease, the imaging elements 5a and 5b are placed so that the respective scanning lines thereof can become parallel to each other or substantially parallel to each other.

In an actual configuration, in usual, it is difficult to adopt a configuration so that the optical axes can be parallel to each other and that the scanning lines can be parallel to each other, and accordingly, these are in a substantially parallel state having errors. However, for the first image g1 and the second image g2, which are to be supplied from the unifocal camera 31 and zoom camera 32, the information processing device 200A performs processing (also referred to as "collimation processing") using camera parameters of the unifocal camera 31 and zoom camera 32, whereby a state equivalent to that in the case where the optical axes of the respective cameras of the stereo camera 300A are parallel to each other and the scanning lines thereof are parallel to each other. Note that "parallel" in the invention of this application stands for parallel or substantially parallel.

The imaging elements 5a and 5b are, for example, imaging elements composed of CCD image sensors or CMOS image sensors, which have effective pixels of the VGA (640×480 pixels) size.

The imaging elements 5a and 5b individually create image signals corresponding to intensities of the images formed on the imaging elements 5a and 5b, and in addition, individually supply the image signals to the control processing circuit 25a and the control processing circuit 25b.

The control processing circuit 25a and the control processing circuit 25b process the respective image signals to be supplied from the imaging elements 5a and 5b and convert the image signals into digital images, thereby individually create the first image g1 and the second image g2, which correspond to the effective pixels of the respective imaging elements, and supply the first image g1 and the second image g2 to the information processing device 200A.

Moreover, the drive mechanism 26 is a drive mechanism composed of, for example, a pulse motor, a feed screw and the like for varying the focal length f2.

The control processing circuit 25b operates the drive mechanism 26 based on a drive control value 51 such as the number of drive pulses for controlling the focal length f2, the drive control value 51 being supplied from the information processing device 200A, and thereby varies ("zooms") a value of the focal length f2.

Here, a deviation amount d of the stereo camera 300A is a positional deviation amount between the optical center 3a and the optical center 3b along an optical axis 4a (4b) direction, and a configuration is adopted so that the deviation amount d regarding the stereo camera 300A can be constant irrespective of a zoom operation of the zoom camera 32.

That is to say, in the stereo camera 300A, even if the focal length f2 of the zoom camera 32 is varied by the zoom operation, a position of the optical center 3b is not varied with respect to the optical center 3a.

For example, in the case where the optical center 3b moves with respect to the optical center 3a by the variations of the focal length f2 owing to the zooming, the whole of the zoom camera 32 is moved by a moving amount of such movement of the optical center 3b in a direction opposite to a direction of the movement concerned by a drive mechanism (not shown) set separately, whereby the zoom camera 32, in which the position of the optical center 3b with respect to the optical center 3a is not varied even by such a zoom operation, can be realized.

Moreover, information such as drive control value-corresponding information t1 to be described later, parameter-corresponding information t2 to be described later, and the base length b of the stereo camera 300A, the information being to be created in the manufacturing time calibration in the manufacturing process of the stereo camera 300A, is stored in a storage unit (not shown) provided in an inside of the stereo camera 300A, and is supplied to the information processing device 200A connected to the stereo camera 300A.

<○ Configuration and Operation of Stereo Camera 300B:>

FIG. 3 is a block diagram illustrating a functional configuration of the stereo camera 300B according to the embodiment. As shown in FIG. 3, the stereo camera 300 B is composed by mainly including: the unifocal camera 31 as the camera including the focal length-fixed imaging optical system 9a; and the zoom camera 32 as the camera including the focal length-variable imaging optical system 9b.

The stereo camera 300B has a substantially similar configuration to that of the stereo camera 300A, and performs substantially similar operations to those thereof; however, has a difference from the stereo camera 300A in a part of the configuration/operations.

The difference concerned is that, in the stereo camera 300B, the deviation amount d is varied following the zoom operation of the zoom camera 32 while the deviation amount d is constant irrespective of the zoom operation of the zoom camera 32 in the stereo camera 300A.

Note that the configuration/operations of the stereo camera 300 B, which are other than the difference concerned, are similar to the configuration and operations of the stereo camera 300A, and accordingly, a description thereof is omitted.

○ Variation of Stereo Camera:

As the stereo camera 300A, for example, in addition to the above-mentioned configuration of the stereo camera 300A, such a one is further adoptable, which has a configuration in which the value of the constant deviation amount d is zero or substantially zero, that is, a segment connecting the optical centers 3a and 3b to each other is perpendicular or substantially perpendicular to the optical axis 4a.

Moreover, as the stereo camera 300B, for example, in addition to the above-mentioned configuration of the stereo camera 300B, such a one is further adoptable, which is capable of detecting the value of the deviation amount d at an imaging time based on a value of the drive control value 51 or the like, and is capable of supplying the detected value of the deviation amount d to the information processing device 200A through the storage unit (not shown) provided in the inside of the stereo camera.

Moreover, as the stereo cameras 300A and 300B, for example, in addition to the above-mentioned respective configurations of the stereo cameras 300A and 300B, such ones are further adoptable, in each of which there is known the value of the focal length f2 of the imaging optical system 9b at a structural abutting position such as an end portion of a drive range where the imaging optical system 9b of the zoom camera 32 is concerned with the zoom, or at such a position where the optical state of the imaging optical system 9b is detectable by a positional sensor and the like, and the value concerned is suppliable to the information processing device 200A through the storage unit (not shown) provided in the inside of the stereo camera.

Note that, in each of the stereo cameras 300A and 300B, specification information for specifying the above-mentioned difference in the structure and the function is held in the storage unit concerned, and the specification information concerned is supplied to the information processing device 200A.

The information processing device 200A obtains the specification information concerned, and performs the control, the field calibration and the like, which correspond to the configurations and functions of the respective stereo cameras, whereby the information processing system 100A is composed so as to be capable of using the respective stereo cameras as variations of the stereo camera 300A (300B), which are different from one another in configuration and function, in combination with the information processing device 200A.

More specifically, based on the specification information concerned, the information processing device 200A adaptively and selectively executes a program for performing the field calibration and the like, which correspond to the configurations and functions of the variety of stereo cameras to be specified from the specification information concerned, and can thereby perform the field calibration and the like, which correspond to the variety of stereo cameras.

Note that, in the case where a plurality of field calibration methods are adoptable for the configurations and functions of the stereo cameras to be specified by the specification information concerned, a CPU 11A displays the adoptable calibration methods on a display unit 43, and based on calibration method specification information in which, by using an operation unit 42, an operator specifies the calibration method to be adopted, the CPU 11A executes a program for performing the specified calibration method.

<⊙ Regarding Configuration of Information Processing Device 200A:>

As shown in FIG. 1, the information processing device 200A composed by mainly including: the CPU 11A; an input/output unit 41; the operation unit 42; the display unit 43; a ROM 44; a RAM 45; and a storage device 46, and for example, is realized by executing a program in a general-purpose computer.

For example, the input/output unit 41 is composed of an input/output interface such as a USB interface, and performs input of image information and the like, which are to be supplied from the stereo camera 300A (300B) to the information processing device 200A, and output of a variety of control signals and the like from the information processing device 200A to the stereo camera 300A (300B).

For example, the operation unit 42 is composed of a keyboard, a mouse or the like, and the operator operates the operation unit 42, whereby setting of a variety of control parameters for the information processing device 200A, setting of a variety of operation modes of the information processing device 200A, and the like are performed.

For example, the display unit 43 is composed of a liquid crystal display, and performs display of various pieces of image information of the second image g2 to be supplied from the stereo camera 300A (300B), the pseudo image 53 (FIG. 2) regarding the second image g2, which is to be created by the information processing device 200A, and the like, and in addition, performs display of various pieces of information regarding the information processing system 100A, a GUI (Graphical User Interface) for the control, and the like.

The ROM (Read Only Memory) 44 is a read only memory, and stores a program for operating the CPU 11A, and the like. Note that a nonvolatile memory (for example, a flash memory), which is freely readable and writable, may be used in place of the ROM 44.

The RAM (Random Access Memory) 45 is a volatile memory that is freely readable and writable, and functions as a temporal storage device for a variety of images obtained by an image obtaining unit 12, a pseudo image to be created by a pseudo image creating unit 16, and the like, a work memory that temporarily stores processing information of the CPU 11A, and the like.

For example, the storage device 46 is composed of a freely readable and writable nonvolatile memory such as a flash memory, a hard disk device, or the like, and permanently records various pieces of information such as setting information for the information processing device 200A.

Moreover, a storage unit 47 is provided in the storage device 46, and the storage unit 47 further has a variety of functional units to be described later, such as a field calibrating information storage unit 47a, a drive control value-corresponding information storage unit 47b, a parameter-corresponding information storage unit 47c, and a three-dimensionalization parameter storage unit 47d (individually in FIG. 2).

To the field calibrating information storage unit 47a, various pieces of information such as a standard focal length fs for use in the field calibration for the focal length of the zoom camera 32 to be described later are supplied from the operation unit 42, the stereo camera 300A (300B) and the like, and are stored therein.

Note that, as will be described later, there is a case where the known focal length f1 of the unifocal camera 31 is adopted as the standard focal length fs, and there is a case where the known focal length when the imaging optical system 9b of the zoom camera 32 is located at a position where reproducibility of the optical state of the imaging optical system 9b is high in the drive range where the imaging optical system 9b of the zoom camera is concerned with the zoom operation thereof, for example, located at a physical abutting position of the end portion of the drive range is adopted as the standard focal length fs.

Moreover, to the drive control value-corresponding information storage unit 47b, the drive control value-corresponding information t1, which expresses a correspondence relationship between the drive control value 51 (FIG. 1, FIG. 2) for controlling the focal length of the zoom camera 32 and the focal length of the zoom camera 32, is supplied from the stereo camera 300A (300B) connected to the information processing device 200A, and is stored therein.

Moreover, to the parameter-corresponding information storage unit 47c, parameter-corresponding information t2, which expresses a correspondence relationship between the focal length of the zoom camera 32 in the stereo camera 300A (300B) and each of the calibrated camera parameters of the zoom camera 32, is supplied from the stereo camera 300A (300B) connected to the information processing device 200A, and is stored therein.

Note that the parameter-corresponding information t2 is information, which is created by the manufacturing time calibration to be performed in the manufacturing process of the stereo camera 300A (300B), and is stored in the stereo camera 300A (300B).

Moreover, to the three-dimensionalization parameter storage unit 47d, a first camera parameter p1 as a camera parameter regarding the unifocal camera 31 and the base length b of the stereo camera 300A (300B) are supplied from the stereo camera 300A (300B), and are stored therein.

The first camera parameter p1 and the base length b are obtained in advance by the manufacturing time calibration of the stereo camera 300A (300B), and are stored in the inside of the stereo camera 300A (300B).

The CPU (Central Processing Unit) 11A is a control processing device that controls the respective functional units of the information processing device 200A in a centralized manner, and executes control and processing, which are in accordance with the program stored in the ROM 44.

As will be described later, the CPU 11A also functions as the image obtaining unit 12, a focal length obtaining unit 13, a camera parameter obtaining unit 14, a three-dimensionalization unit 15, the pseudo image crating unit 16, and a zoom control unit 17.

By these functional units, the CPU 11A performs the obtainment of the stereo images and the like regarding the images for the various calibrations and the subject as an object of the stereoscopic image creation, the field calibration of the drive control value-corresponding information t1 that expresses the correspondence relationship between the drive control value for controlling the focal length of the zoom camera 32 and the focal length of the zoom camera 32, the field calibration of the focal length of the zoom camera 32, and in addition, control of the imaging operation of the stereo camera 300A (300B), the zoom operation of the zoom camera 32, and the like.

Moreover, the CPU 11A also performs the creation of the distance information 52 of the subject imaged by the stereo camera 300A (300B), obtainment of a second camera parameter p2 as a camera parameter regarding the zoom camera 32 for use in the creation of the distance information 52, the creation of the pseudo image 53 (FIG. 2) corresponding to the image when the virtual camera images the subject from the viewpoint different from the first viewpoint from which the zoom camera 32 images the second images g2 regarding the subject, and in addition, display of the stereoscopic image set composed of the second image g2 and the pseudo image 53 on the display unit 43, and the like.

The CPU 11A, the input/output unit 41, the operation unit 42, the display unit 43, the ROM 44, the RAM 45, the storage unit 46 and the like are electrically connected individually to one another through a signal line 49. Hence, at predetermined timing, the CPU 11A can execute, for example, the control of the stereo camera 300A (300B) through the input/output unit 41, the obtainment of the image information from the stereo camera 300A (300B), the display of the image information on the display unit 43, and the like.

Note that, in a configuration example shown in FIG. 1, the respective functional units, which are the image obtaining unit 12, the focal length obtaining unit 13, the camera parameter obtaining unit 14, the three-dimensionalization unit 15, the pseudo image creating unit 16, and the zoom control unit 17, are realized by executing predetermined programs in the CPU 11A; however, these respective functional units may be individually realized, for example, by dedicated hardware circuits and the like.

<⊙ Operations of Respective Functional Units of Information Processing Device 200A:>

Figure 2:
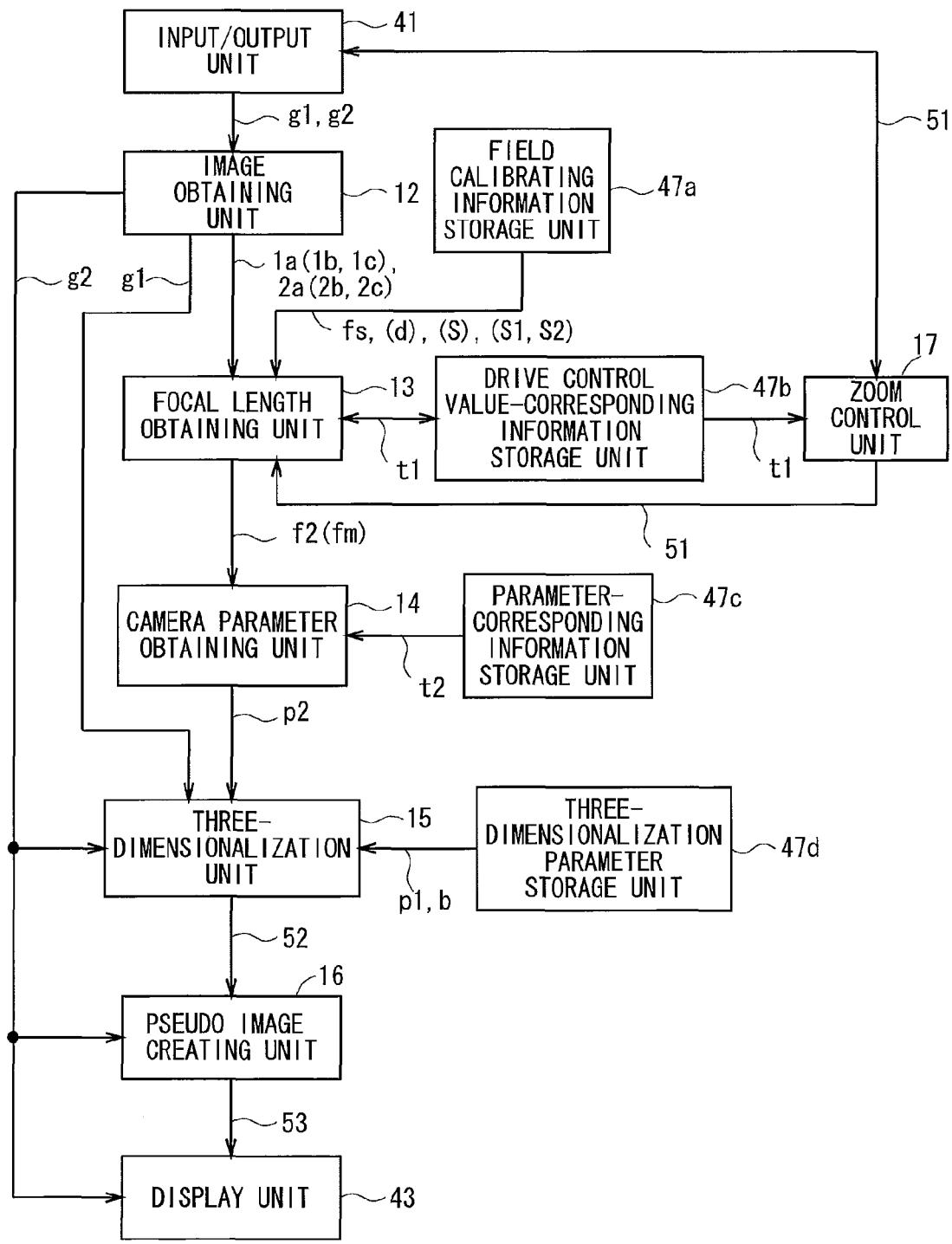
FIG. 2 is a block diagram illustrating a main functional configuration of an information processing device according to the embodiment.

FIG. 2 is a block diagram illustrating a main functional configuration of the information processing device 200A according to the embodiment. A description is made below of the operations of the respective functional units of the information processing device 200A, which are shown in FIG. 2.

○ Operation of Image Obtaining Unit 12:

Through the input/output unit 41, the image obtaining unit 12 obtains the first image g1, in which the focal length-fixed unifocal camera 31 images the subject, and the second image g2, in which the focal length-variable zoom camera 32 images the subject.

At the stereoscopic image creating time, the image obtaining unit 12 supplies the first image g1 to the three-dimensionalization unit 15, and in addition, supplies the second image g2 to the three-dimensionalization unit 15, the pseudo image creating unit 16 and the display unit 43.

Moreover, at the field calibration time of the focal length of the zoom camera 32, the image obtaining unit 12 obtains, as a standard image 1a (or a first standard image 1b and a second standard image 1c), the image in which the unifocal camera 31 images the calibration object, or the image in which the zoom camera 32 images the calibration object, the zoom camera 32 being in which the imaging optical system 9b thereof is in an optical state where position reproducibility is high such as being located at the physical abutting position, and the focal length is in a known optical state.

Moreover, at the field calibration time of the focal length of the zoom camera 32, the image obtaining unit 12 obtains, as a reference image 2a (or a first reference image 2b and a second reference image 2c), the image in which the zoom camera 32 images the calibration object at the time of turning to an optical state different from the above-mentioned known optical state by the zoom operation, and supplies these images to the focal length obtaining unit 13.

Note that the focal length regarding the standard image is supplied from the stereo camera 300A (300B) to the information processing device 200A, and is stored as the standard focal length fs, which is one of the information necessary for the field calibration of the focal length, in the field calibrating information storage unit 47a, and is used for the field calibration of the focal length.

Moreover, the image obtaining unit 12 may obtain the first image g1 and the second image g2, which are imaged and stored in the recording medium in advance, through the input/output unit 41.

○ Operation of Focal Length Obtaining Unit 13:

(a) Operation in Field Calibration of Focal Length of Zoom Camera 32:

In the "field calibration of the focal length" of the zoom camera 32, the focal length obtaining unit 13 obtains a value of a reference focal length fm (FIG. 2) when the respective reference images are imaged based on arithmetic operation processing for scaling the value of the standard focal length fs (FIG. 2) by using the information of the image sizes of the calibration object in the respective standard images and the respective reference images, which are supplied from the image obtaining unit 12, and the information of the standard focal length fs supplied from the field calibrating information storage unit 47a, and the like.

Next, the focal length obtaining unit 13 performs processing for obtaining the obtained reference focal length fm as an actual focal length at the point of a calibration time for the zoom camera 32 that images the respective reference images.

(b) Operation in Field Calibration of Drive Control Value-Corresponding Information t1:

In the information processing system 100A, the drive control value-corresponding information t1, which expresses the relationship between the drive control value such as the number of pulses and the control voltage and the focal length of the zoom camera 32 with respect to the drive control value concerned, is varied owing to displacement of the drive mechanism 26 by variations of detection characteristics of a position sensor that detects a predetermined position of the imaging optical system 9b of the zoom camera 32, abrasion of a gear and the like of the drive mechanism 26, an attitude change of the stereo camera, and the like.

Accordingly, the focal length obtaining unit 13 performs "field calibration of the drive control value-corresponding information t1" for calibrating the varied drive control value-corresponding information t1.

In the field calibration of the drive control value-corresponding information t1, the focal length obtaining unit 13 first performs the field calibration of the focal length for the zoom camera 32 zoomed in accordance with the predetermined drive control value 51, and thereby obtains the focal length of the zoom camera 32 at the point of field calibration time.

Next, the focal length obtaining unit 13 estimates a focal length, which corresponds to the drive control value 51 obtained from the zoom control unit 17, based on the drive control value 51 and on the drive control value-corresponding information t1 obtained from the drive control value-corresponding information storage unit 47b, and checks whether or not a difference between the estimated focal length and the focal length obtained by the field calibration of the focal length is within a predetermined range.

In the case where this difference exceeds the predetermined range as a result of the check, the focal length obtaining unit 13 determines that the optical state of the zoom camera 32 is largely deviated from the optical state thereof when the drive control value-corresponding information t1 is created, and also for other drive control values, performs the field calibration of the focal lengths in a similar way.

The focal length obtaining unit 13 allows the respective focal lengths, which are newly obtained by a series of the field calibration of the focal lengths, to correspond to the respective drive control values 51, thereby updates the drive control value-corresponding information t1, stores the updated drive control value-corresponding information t1 in the drive control value-corresponding information storage unit 47b, and in addition, also updates the drive control value-corresponding information t1 stored in the storage unit in the inside of the stereo camera 300A (300B).

(c) Operation at Pseudo Image Creating Time:

At the pseudo image creating time, the focal length obtaining unit 13 obtains the focal length of the zoom camera 32 by two types of methods.

Figure 18:
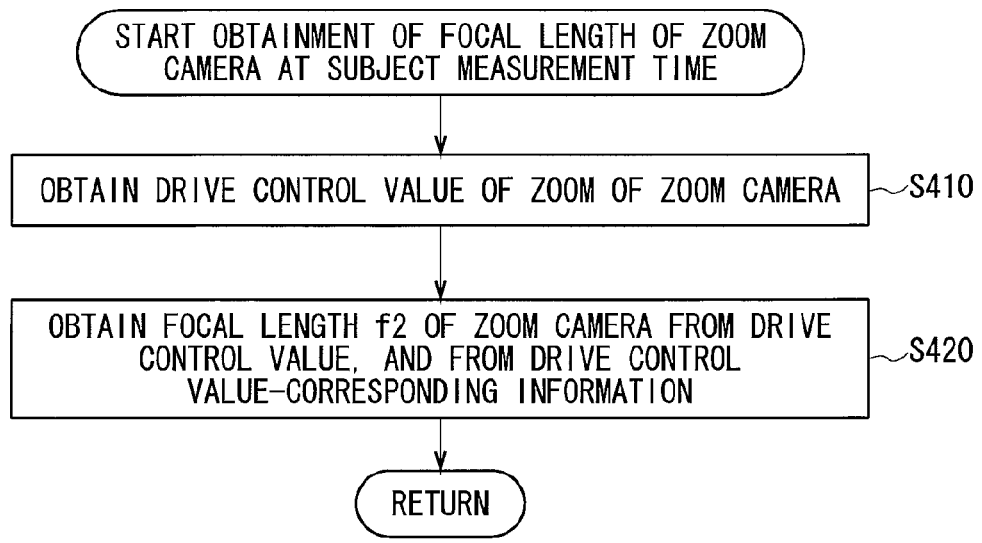
FIG. 18 is a view showing an example of an operation flow related to obtainment of a focal length of a zoom camera at a subject measurement time in the operation flow of FIG. 17.

As one of the two types of methods, the focal length obtaining unit 13 performs processing for estimating the focal length, which corresponds to the drive control value 51 at the present point of time, based on the drive control value-corresponding information t1, and obtaining the focal length concerned as the focal length of the zoom camera 32 (an operation flow of FIG. 18).

Figure 19:
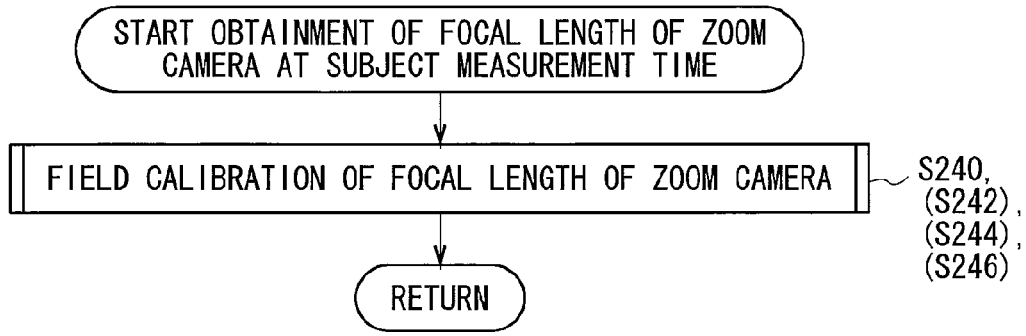
FIG. 19 is a view showing an example of the operation flow related to the obtainment of the focal length of the zoom camera at the subject measurement time in the operation flow of FIG. 17.

Moreover, as another of the two types of methods, the focal length obtaining unit 13 performs processing for performing the field calibration of the focal length of the zoom camera 32 at the imaging time of the image for creating the pseudo image, and obtaining the obtained focal length as the focal length of the zoom camera 32 (an operation flow of FIG. 19).

Selection of one method from between the two types of methods is performed, for example, based on an operation mode set from the operation unit 42 in advance, and the like.

The obtained focal length of the zoom camera 32 is supplied to the camera parameter obtaining unit 14, and is served for the obtainment of the camera parameter of the zoom camera 32, which corresponds to the focal length concerned.

○ Operation of Camera Parameter Obtaining Unit 14:

In the operation for the pseudo image creation, based on the focal length of the zoom camera 32, which is supplied from the focal length obtaining unit 13, and on the parameter-corresponding information t2 recorded in the parameter-corresponding information storage unit 47c, the camera parameter obtaining unit 14 obtains the second camera parameter p2 as a variety of camera parameters of the zoom camera 32, which correspond to the focal length, and then supplies the second camera parameter p2 to the three-dimensionalization unit 15.

Note that, as the second camera parameter p2, specifically, there is adopted at least one of a distortion correction coefficient, the image center position 7b (FIG. 3), the focal length, skew (an inclination between the imaging optical system and an imaging element surface), and the positional deviation amount d between the optical centers of the unifocal camera 31 and the zoom camera 32.

○ Operation of Three-Dimensionalization Unit 15:

The three-dimensionalization unit 15 obtains the second camera parameter p2 regarding the zoom camera from the camera parameter obtaining unit 14, and in addition, from the three-dimensionalization parameter storage unit 47d, obtains the first camera parameter p1 as a variety of the camera parameters regarding the unifocal camera 31 and the base length b between the unifocal camera 31 and the zoom camera 32.

From the first image g1 and the second image g2 regarding the subject as the creation target of the stereoscopic image, which are supplied from the image obtaining unit 12 by using the respective obtained parameters, the three-dimensionalization unit 15 obtains the distance information 52 of the subject by the principle of the triangulation, and supplies the distance information 52 to the pseudo image creating unit 16.

○ Operation of Pseudo Image Creating Unit 16:

The pseudo image creating unit 16 is supplied with the second image g2 of the subject and the distance information 52 of the subject from the image obtaining unit 12 and the three-dimensionalization unit 15, respectively, and based on these pieces of information, obtains the pseudo image 53 equivalent to the image in which the virtual camera placed at another virtual viewpoint from that of the zoom camera 32 images the subject.

More specifically, based on the imaging parameters regarding each of the zoom camera 32 and the virtual camera, such as the focal length, the number of pixels and the pixel size, and on coordinate system information as position and attitude relationships between the zoom camera 32 and the virtual camera, the pseudo image creating unit 16 obtains correspondence relationships between the respective coordinates on an image as the second image g2 and the respective coordinates on an image as the pseudo image 53.

Next, based on the correspondence relationships concerned and on pixel values of the respective pixels of the second image g2, the pseudo image creating unit 16 imparts pixel values to the respective pixels of the pseudo image 53, and so on, thereby creates the pseudo image 53. Note that the imaging parameters concerned and the coordinate system information concerned are stored in the storage unit 47.

The pseudo image creating unit 16 supplies the created pseudo image 53 to the display unit 43, and on the display unit 43, the pseudo image 53 and the second image g2 are displayed as the stereoscopic image set individually.

○ Operation of Zoom Control Unit 17:

At the field calibration time of the drive control value-corresponding information t1, the zoom control unit 17 supplies the respective drive control values 51, which define the drive control value-corresponding information t1, to the stereo camera 300A (300B) through the input/output unit 41, and controls the focal length of the zoom camera 32.

Moreover, the zoom control unit 17 supplies the drive control values 51, which are supplied to the zoom camera 32, also to the focal length obtaining unit 13, and the focal length obtaining unit 13 obtains the focal length, which corresponds to the drive control values supplied from the zoom control unit 17, based on the drive control value-corresponding information t1.

<○ Regarding Field Calibration of Focal Length:>

Next, a description is made of the field calibration of the focal length of the zoom camera 32, which is to be performed by the focal length obtaining unit 13.

In the information processing system 100A, as mentioned above, for the stereo cameras 300A and 300B, and the stereo camera having a configuration and functions, which are derived from these, the stereo cameras being taken as targets, the focal lengths of the zoom cameras 32 thereof when the zoom cameras 32 image the images of the object are calibrated.

⊙ Field Calibrations A and B of Focal Length:

For example, field calibration A of the focal length is field calibration of the focal length of the zoom camera 32 or the like in the stereo camera 300A (hereinafter, referred to as a "stereo camera 300A1") in which the value of the deviation amount d is zero or substantially zero among such stereo cameras 300A in each of which the deviation amount d (FIG. 3) is constant.

Moreover, for example, field calibration B of the focal length is field calibration of the focal length of the zoom camera 32 or the like in the stereo camera 300A (hereinafter, referred to as a "stereo camera 300A2") in which there is known the value of the focal length f2 of the imaging optical system 9b at the structural abutting position such as the end portion of the drive range where the imaging optical system 9b of the zoom camera 32 is concerned with the zoom, or at such a position where the optical state of the imaging optical system 9b is detectable by the positional sensor and the like, and the value concerned is suppliable to the information processing device 200A through the storage unit (not shown) provided in the inside of the stereo camera among such stereo cameras 300A in each of which the deviation amount d (FIG. 3) is constant.

Note that the above-mentioned position (optical state) of the imaging optical system 9b, in which the value of the focal length f2 of the imaging optical system 9b is known, is a position where reproducibility of position control for the imaging optical system 9b is high.

FIG. 4 is a view explaining an example of obtainment of data for the field calibration A of the focal length in the stereo camera 300A1.

In FIG. 4, one calibration object 62 with an unknown actual size, the calibration object 62 being placed at a certain unknown imaging distance, is measured once by once individually by, among the respective cameras of the stereo camera 300A, the unifocal camera 31 in which the focal length is the known standard focal length fs (focal length f1), and the zoom camera 32 in which the focal length is the unknown reference focal length fm, whereby the standard image 1a and the reference image 2a are obtained.

Moreover, in FIG. 4, for use in the field calibration for obtaining the unknown reference focal length fm of the zoom camera 32, an image size Ws and image size Wm of the calibration object 62 respectively in the standard image 1a and the reference image 2a are obtained.

The principal rays 6a and 6b, which are shown in FIG. 4, are the respective principal rays, which pass through the optical centers 3a and 3b, respectively, among reflected light coming from outer edge portions of the calibration object 62.

In FIG. 4, in order to facilitate grasping of the positional relationships regarding the respective optical centers 3a and 3b of the unifocal camera 31 and the zoom camera 32, the imaging element 5a and the imaging element 5b, and the calibration object 62, the optical axes 4a and 4b are displayed so as to be superimposed on each other, the optical centers 3a and 3b are displayed so as to be superimposed on each other, and the principal rays 6a and 6b are displayed so as to be superimposed on each other.

Figure 9:
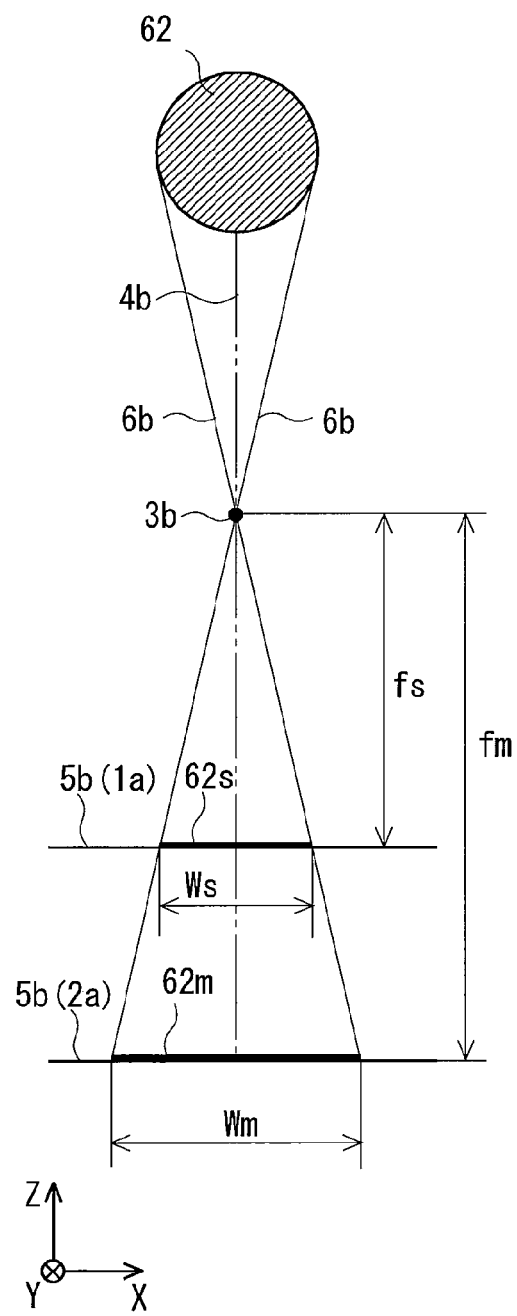
FIG. 9 is a view explaining an example of the obtainment of the data for the field calibration of the focal length.

FIG. 9 is a view explaining an example of obtainment of data for the field calibration B of the focal length, which is to be performed by using the stereo camera 300A2.

In FIG. 9, one calibration object 62 with an unknown actual size, the calibration object 62 being placed at a certain unknown imaging distance, is measured one by one individually by the zoom camera 32 of the stereo camera 300A2, which is set in the optical state having the known standard focal length fs, and by the zoom camera 32 of the stereo camera 300A2, which is set in the optical state having the unknown reference focal length fm, whereby the standard image 1a and the reference image 2a are obtained.

Moreover, in FIG. 9, for use in the field calibration for obtaining the unknown reference focal length fm of the zoom camera 32, an image size Ws and image size Wm of the calibration object 62 respectively in the standard image 1a and the reference image 2a are obtained.

Note that the standard focal length fs in FIG. 9 is the known focal length of the imaging optical system 9b at the structural abutting position such as the end portion of the drive range where the imaging optical system 9b of the zoom camera 32 is concerned with the zoom, or at such a position where the optical state of the imaging optical system 9b is detectable by the positional sensor and the like.

The principal rays 6b shown in FIG. 9 are the respective principal rays, which pass through the optical center 3b, among reflected light coming from outer edge portions of the calibration object 62 when the calibration object 62 is imaged twice by the zoom camera 32.

In FIG. 9, in order to facilitate grasping of the positional relationships regarding the respective optical centers 3b of the zoom camera 32 in which the focal length is the known standard focal length fs and of the zoom camera 32 in which the focal length is the unknown reference focal length fm, the imaging element 5b, and the calibration object 62, the respective optical axes 4b of the standard image 1a and the reference image 2a are displayed so as to be superimposed on each other, the respective optical centers 3b thereof are displayed so as to be superimposed on each other, and the principal rays 6b thereof are displayed so as to be superimposed on each other.

Here, by using FIG. 5 to FIG. 8, a description is made of the obtainment of the image size Ws and image size Wm of FIG. 4.

Figure 5:
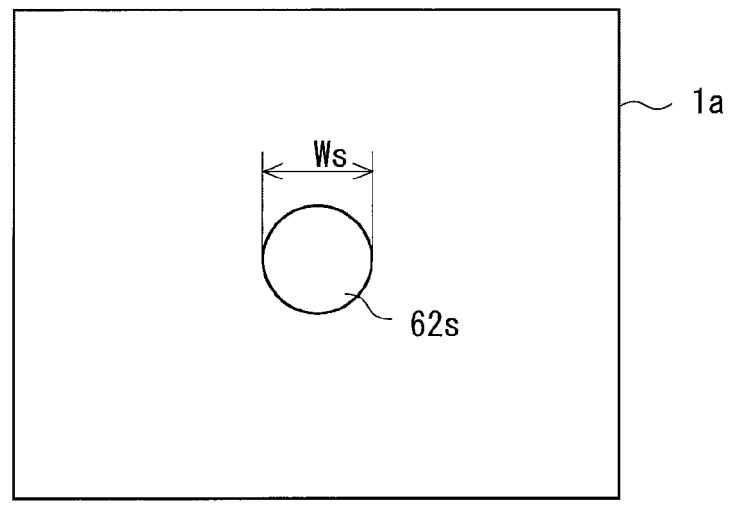
FIG. 5 is a view showing an example of an image size.
Figure 6:
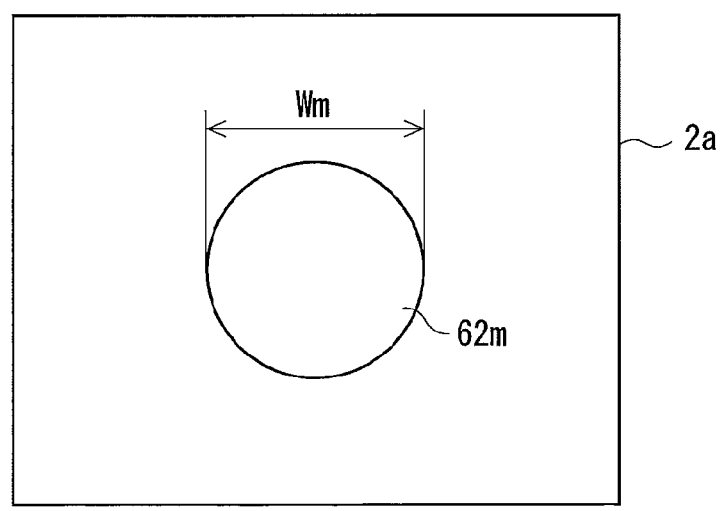
FIG. 6 is a view showing an example of the image size.

FIG. 5 and FIG. 6 are views showing examples of the image sizes Ws and Wm, respectively.

The standard image 1a and the reference image 2a, which are shown in FIG. 5 and FIG. 6, respectively, are images in which the unifocal camera 31 and the zoom camera 32 image the spherical calibration object 62 (FIG. 4), respectively, and an image 62s and an image 62m are circular images of the calibration object 62 in the standard image 1a and the reference image 2a, respectively.

Moreover, the image size Ws is a diameter of the image 62s, and the image size Wm shown in FIG. 6 is a diameter of the image 62m.

Note that the image sizes Ws and Wm are obtained, for example, by a method of fitting circles to the respective outer edges of the images 62s and 62m and obtaining diameters of the fitted circles, and the like.

Figure 7:
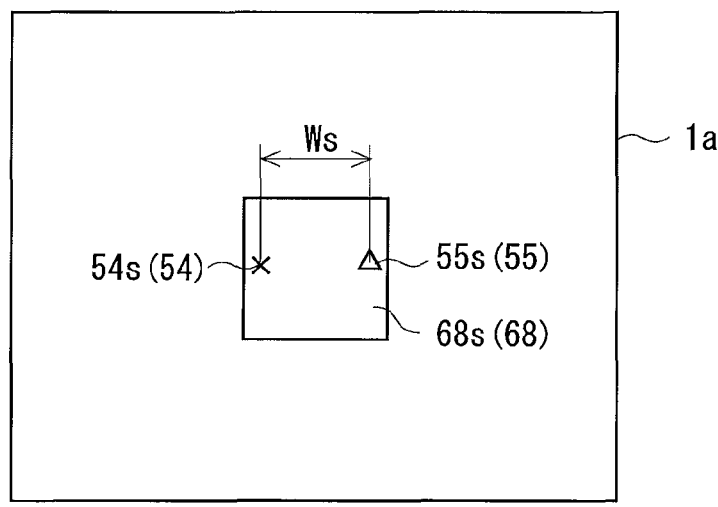
FIG. 7 is a view showing an example of the image size.
Figure 8:
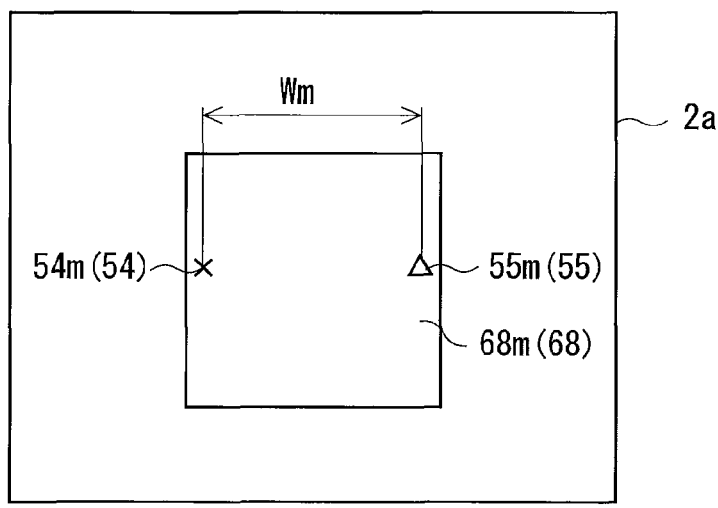
FIG. 8 is a view showing an example of the image size.

Moreover, FIG. 7 and FIG. 8 are views showing other examples of the image sizes Ws and Wm, which are different from the examples shown in FIG. 5 and FIG. 6, respectively.

A standard image 1a and a reference image 2a, which are shown in FIG. 7 and FIG. 8, respectively, are images in which the unifocal camera 31 and the zoom camera 32 image a cubic calibration object 68 (FIG. 7, FIG. 8), and an image 68s and an image 68m are images of the calibration object 68 in the standard image 1a and the reference image 2a, respectively.

Moreover, images 54s and 55s are images of feature portions 54 and 55 (FIG. 7, FIG. 8) of the calibration object 68 in the image 68s, respectively, and images 54m and 55m are images of the feature portions 54 and 55 thereof in the image 68m, respectively.

For example, the focal length obtaining unit 13 performs image processing such as edge detection processing for the standard image 1a taken as an object, obtains coordinate information of the images 54s and 55s, which the operator instructs through the operation unit 42 in the image 68s displayed on the display unit 43, or so on, and thereby obtains the coordinate information of the images 54s and 55s.

Next, for example, by using a corresponding point search method using a SAD (Sum of Absolute Difference) method and the like, the focal length obtaining unit 13 searches the images 54m and 55m on the reference image 2a, which correspond to the images 54s and 55s, respectively, and so on, and thereby obtains the coordinate information of the images 54m and 55m.

From the respective pieces of the coordinate information of the images 54s and 55s, the focal length obtaining unit 13 obtains a distance between the images 54s and 55s as the image size Ws, and in addition, obtains a distance between the images 54m and 55m as the image size Wm in a similar way.

As described above, even if not the overall width of the image but the image size of a part of the image is obtained as the image size of the image of the calibration object, usefulness of the present invention is not damaged.

Note that the obtaining method of the image size Ws and the image size Wm, which is mentioned above by using FIG. 5 to FIG. 8, is also applied in a similar way to the obtainment of the respective image sizes in other field calibrations B to F, which is described in this specification.

When the image size Ws and the image size Wm are obtained in the field calibration A or the field calibration B, the reference focal length fm is given by Expression (1) by using the image size Ws and the image size Wm, which are obtained by the above-mentioned respective methods and the like, and using by the standard focal length fs stored in the field calibrating information storage unit 47a.

[Expression 1]

$$fm = fs \times Wm/Ws \qquad (1)$$

Note that an arithmetic expression of the reference focal length fm in the field calibration A is not limited to Expression (1), and for example, even if the distortion correction coefficient of the sizes Ws and Wm, a coefficient for the collimation processing of the standard image 1a and the reference image 2a, and the like are appropriately added to Expression (1) and used in response to desired accuracy of the reference focal length fm, the usefulness of the present invention is not damaged. Moreover, the same is also applied to Expression (2) to Expression (5).

Next, a description is made of an operation flow of the information processing device 200A, which is related to the field calibration A and the field calibration B.

Figure 20:
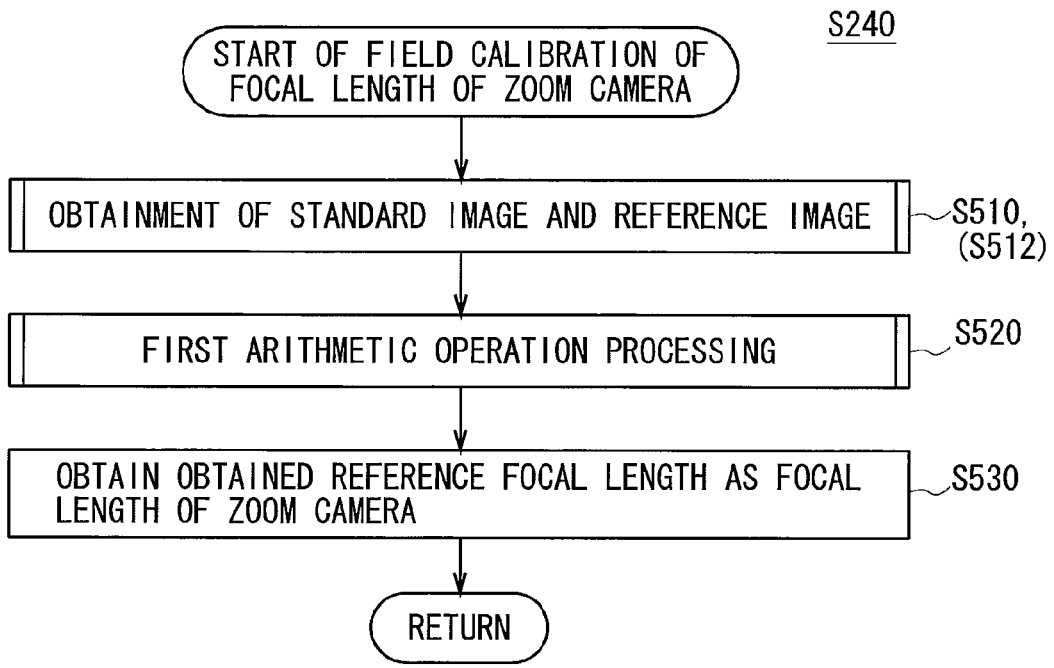
FIG. 20 is a view showing an example of the operation flow related to the field calibration of the focal length of the zoom camera in the operation flow of FIG. 16 or FIG. 19.

FIG. 20 is a view showing an example of an operation flow related to the field calibration (Step S240) of the focal length of the zoom camera 32 in an operation flow of FIG. 16 or FIG. 19, which will be described later, and is a view showing an example of an operation flow corresponding to the above-mentioned field calibration A and field calibration B.

Figure 24:
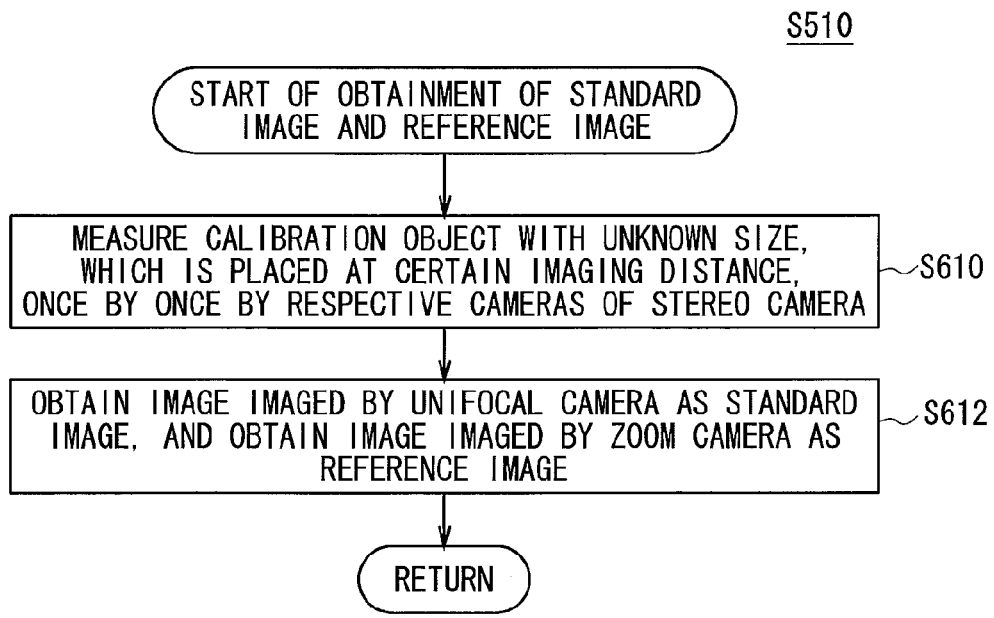
FIG. 24 is a view showing an example of an operation flow related to obtainment of a standard image and a reference image in the operation flow of FIG. 20.

Moreover, FIG. 24 is a view showing an example of an operation flow related to the obtainment (Step S510) of the standard image 1a and the reference image 2a in the field calibration A in the operation flow of FIG. 20.

When the processing shown in FIG. 20 is started in a state where the stereo camera 300A1 is connected to the information processing device 200A, the obtaining processing of the standard image 1a and the reference image 2a in Step S510 is started based on the specification information regarding the stereo camera 300A1, and the processing is shifted to Step S610 of FIG. 24.

In Step S610, by the control of the CPU 11A, the respective cameras of the stereo camera 300A1 measure the calibration object 62 with the unknown size, which is placed at a certain position, once by once.

Note that, at this time, by the control of the zoom control unit 17, the imaging optical system 9b of the zoom camera 32 is set in an imaging-time optical state having the unknown reference local length fm.

Moreover, in the imaging by the unifocal camera 31 and the imaging by the zoom camera 32, both pieces of the imaging are performed in a state where a spatial relationship between the calibration object 62 and the imaging system (the unifocal camera 31 and the zoom camera 32) is kept.

In the stereo camera 300A1, for example, the imaging by the unifocal camera 31 and the imaging by the zoom camera 32 are performed simultaneously or substantially simultaneously, whereby the imaging of the calibration object 62, in which the spatial relationship between the calibration object 62 and the imaging system is kept, is performed.

Next, the focal length obtaining unit 13 obtains the image (first image g1), which the unifocal camera 31 of the stereo camera 300A1 images, and the image (second image g2), which the zoom camera 32 thereof images, as the standard image 1a (FIG. 4) and the reference image 2a (FIG. 4), respectively (Step S612).

Figure 30:
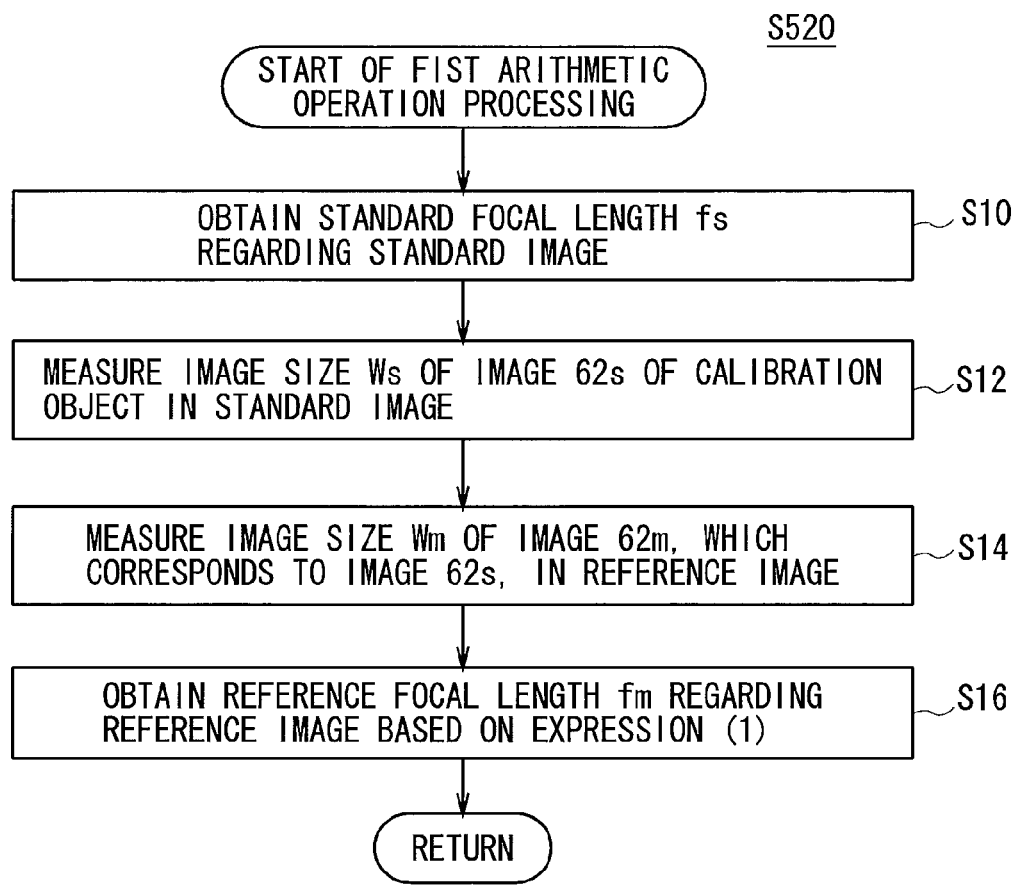
FIG. 30 is a view showing an example of an operation flow related to first arithmetic operation processing in the operation flow of FIG. 20.

When the standard image 1a and the reference image 2a are obtained, first arithmetic operation processing (S520 of FIG. 20) is started, and the processing is shifted to Step S10 of FIG. 30.

Figure 25:
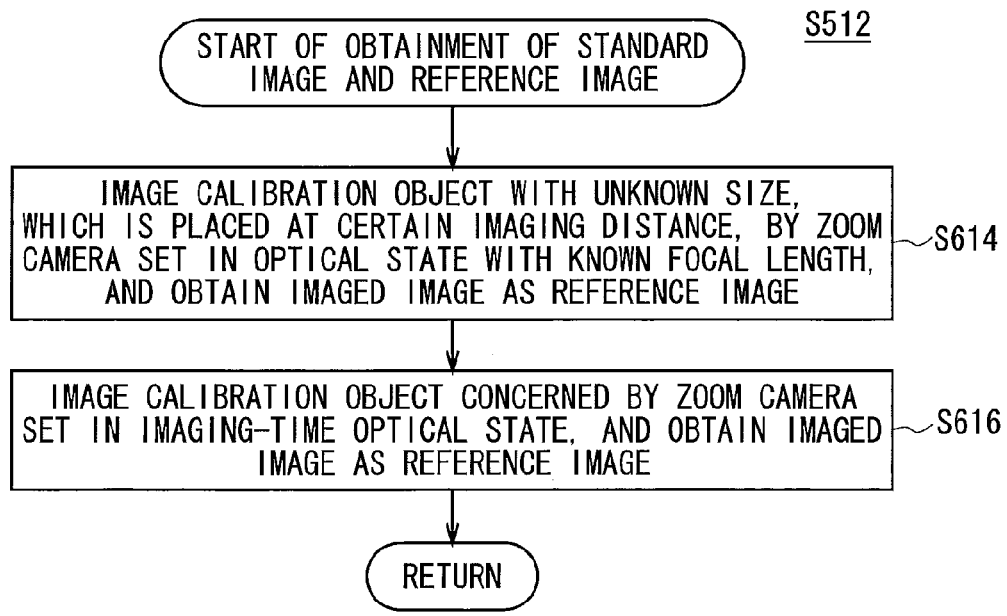
FIG. 25 is a view showing an example of the operation flow related to the obtainment of the standard image and the reference image in the operation flow of FIG. 20.

FIG. 25 is a view showing an example of an operation flow related to obtainment (Step S512) of the standard image 1a and the reference image 2a in the field calibration B in the operation flow of FIG. 20.

When the processing shown in FIG. 20 is started in a state where the stereo camera 300A2 is connected to the information processing device 200A, the obtainment processing of the standard image 1a and the reference image 2a in Step S512 is started based on the specification information regarding the stereo camera 300A2, and the processing is shifted to Step S614 of FIG. 25.

In Step S614, first, the zoom control unit 17 controls the zooming of the zoom camera 32 of the stereo camera 300A2, and varies the state of the imaging optical system 9a to the optical state having the known standard focal length fs (FIG. 9).

By the control of the CPU 11A, the zoom camera 32 measures the calibration object 62 with the unknown size, which is placed at a certain position, one time.

The focal length obtaining unit 13 obtains the image (second image g2), which the zoom camera 32 concerned images, as the standard image 1a (FIG. 9).

The zoom control unit 17 controls the zooming of the zoom camera 32, and sets the imaging optical system 9b in the imaging-time optical state having the unknown reference focal length fm.

By the control of the CPU 11A, the zoom camera 32 measures the calibration object 62, and the focal length obtaining unit 13 obtains the measured image (second image g2) as the reference image 2a (Step S616).

Note that, also for the field calibration B, in order to perform the obtainment of the standard image 1a and the reference image 2a in the state where the spatial relationship between the calibration object and each imaging system is kept, the imaging is performed in a state where the calibration object 62 stands relatively still with respect to the stereo camera 300A2.

Moreover, here, the description has been made of the example of first imaging the standard image 1a; however, even if the reference image 2a is first imaged, the usefulness of the present invention is not damaged.

When the standard image 1a and the reference image 2a are obtained, the processing is shifted to the first arithmetic operation processing (S520 of FIG. 20), and further, is shifted to Step S10 of FIG. 30.

FIG. 30 is a view showing an example of an operation flow related to the first arithmetic operation processing (Step S520) in the operation flow of FIG. 20.

First, from the field calibrating information storage unit 47a, the focal length obtaining unit 13 obtains the standard focal length fs (FIG. 2, FIG. 4, FIG. 9) as the focal length regarding the standard image 1a (Step S10).

The focal length obtaining unit 13 measures the image size Ws (FIG. 4, FIG. 9) of the image 62s (FIG. 4, FIG. 9) of the calibration object 62 (FIG. 4, FIG. 9) in the standard image 1a (Step S12).

Moreover, the focal length obtaining unit 13 measures the image size Wm (FIG. 4, FIG. 9) of the image 62m (FIG. 4, FIG. 9) in the reference image 2a, the image 62m corresponding to the image 62s (Step S14).

Based on Expression (1), the focal length obtaining unit 13 obtains the reference focal length fm (FIG. 2, FIG. 4, FIG. 9) as the focal length regarding the reference image 2a (Step S16).

The processing is returned to FIG. 20, and the focal length obtaining unit 13 obtains the obtained reference focal length fm as the focal length of the zoom camera 32 in the stereo camera 300A1 or 300A2 (Step S530).

In accordance with the field calibration A or the field calibration B, the calibration object with the unknown actual size is imaged at the unknown imaging distance in the state where the spatial relationship thereof with the imaging system is kept, and the standard image 1a and the reference image 2a are obtained.

Then, by using the image sizes Ws and Wm of the calibration object 62 in the standard image 1a and the reference image 2a, Expression (1), that is, the arithmetic operation processing for scaling the value of the standard focal length fs is performed, whereby the value of the reference focal length fm is obtained.

Hence, in accordance with the field calibration A or the field calibration B, in the stereo camera including the zoom camera, in the case where, with regard to the optical center of the imaging optical system having the known standard focal length fs when the standard image is obtained and the optical center of the imaging optical system having the unknown reference focal length fm when the reference image is obtained, the positions thereof in the optical axis direction become equal to each other or substantially equal to each other, the reference focal length fm can be obtained at a high speed based on the calibrating data obtainable in a short time under a simple measurement environment that does not require the information of the imaging distance and actual size of the calibration object, and then the calibration frequency of the stereo camera at a using site thereof can be enhanced.

Moreover, in accordance with the field calibration A, the unifocal camera 31 and the zoom camera 32 are used for the imaging, and accordingly, the standard image 1a and the first standard image 1b can be measured simultaneously or substantially simultaneously.

Hence, the standard image 1a and the first standard image 1b can be obtained in the state where the spatial relationship between the calibration object 62 and the imaging system (the unifocal camera 31 and the zoom camera 32) is kept, and obtaining accuracy of the reference focal length fm can be enhanced.

Moreover, in accordance with the field calibration A, the unifocal camera 31 and the zoom camera 32 can image the calibration object simultaneously or substantially simultaneously, and accordingly, a moving object can be adopted as the calibration object.

Moreover, in accordance with the field calibration A, regions with the same size in the calibration object 62 are individually imaged once by once by the unifocal camera 31 and the zoom camera 32 simultaneously or substantially simultaneously, whereby the image data for the calibration can be obtained. Accordingly, in the case where the subject itself serving as the creation object of the pseudo image 53 has a feature portion to which the method described in FIG. 7 and FIG. 8, and the like are applicable, then the subject itself can be adopted as the calibration object.

⊙ Field Calibration C of Focal Length:

For example, field calibration C of the focal length is performed as field calibration of the focal length of the zoom camera 32 or the like in the stereo camera 300B (hereinafter, referred to as a "stereo camera B1"), which is capable of detecting the value of the imaging-time deviation amount d and supplying such a deviation amount d to the information processing device 200A, among the stereo cameras 300B in each of which the deviation amount d (FIG. 3) is varied by the zoom of the zoom camera 32.

Note that the target of the field calibration C is not limited to the stereo camera 300B1, and the stereo camera between the stereo cameras 300A and 300B, in which the value of the imaging-time deviation amount d is obtainable by the information processing device 200A, becomes an application target of the field calibration C.

Figure 10:
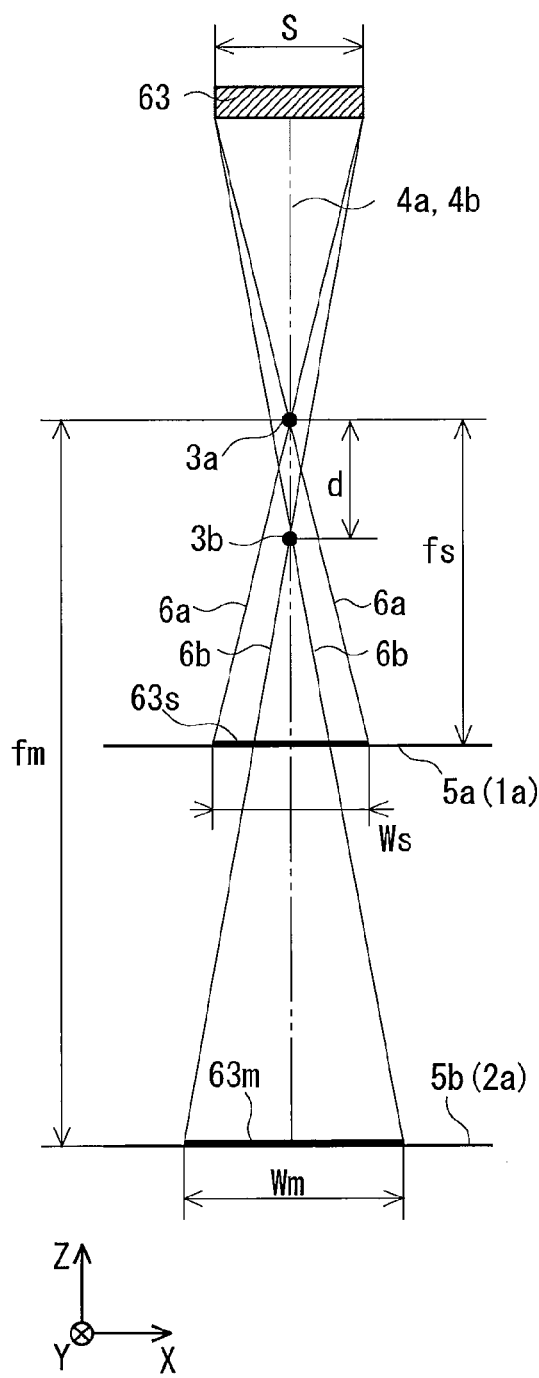
FIG. 10 is a view explaining an example of the obtainment of the data for the field calibration of the focal length.

FIG. 10 is a view explaining an example of obtainment of data for the field calibration C of the focal length of the zoom camera 32 in the stereo camera 300B1.

In FIG. 10, one calibration object 63 with a known actual size, which is placed at a certain unknown imaging distance, is measured once by once individually by the unifocal camera 31, in which the focal length is the known standard focal length fs (focal length f1), and by the zoom camera 32, in which the focal length is the unknown reference focal length fm, among the respective cameras of the stereo camera 300B1, and the standard image 1a and the reference image 2a are obtained.

Moreover, in FIG. 10, a state is shown, where, for use in the field calibration for obtaining the unknown reference focal length fm of the zoom camera 32, the image size Ws and the image size Wm of the calibration object 63 in the respective standard image 1a and the reference image 2a are obtained.

Principal rays 6a and 6b shown in FIG. 10 are the respective principal rays, which pass through the optical centers 3a and 3b, among reflected light coming from outer edge portions of the calibration object 63.

Here, the deviation amount d has, for example, a value of a deviation amount d, which is to be estimated based on information that expresses the value of the deviation amount d corresponding to the drive control value 51 of the zoom and on the imaging-time drive control value 51, a known value of the deviation amount d, which is stored in advance in the storage unit 47 through the operation unit 42, or the like.

Figure 12:
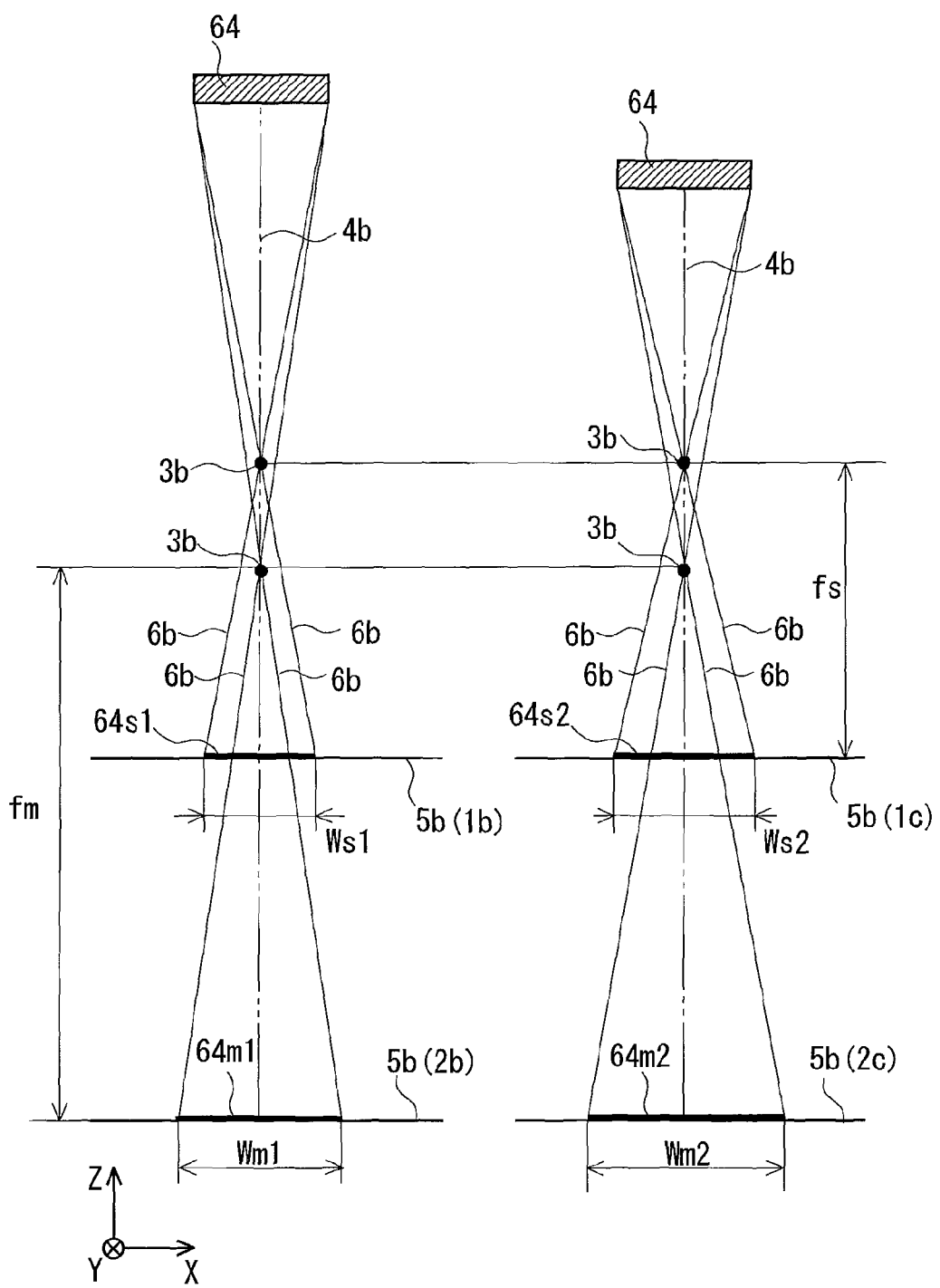
FIG. 12 is a view explaining an example of the obtainment of the data for the field calibration of the focal length.

Note that, in FIG. 10 to FIG. 12, examples are displayed, where the optical center 3a of the unifocal camera 31 is closer to the calibration object than the optical center 3b of the zoom camera 32; however, even in the case where the optical center 3b is closer to the calibration object than the optical center 3a, the usefulness of the invention of this application is not damaged.

Moreover, the calibration object 63 is an object in which an actual size S is known, and a value of the actual size S is stored in advance in the field calibrating information storage unit 47a.

As the calibration object 63, specifically, besides a calibrating chart designed exclusively, for example, a cylindrical one such as a coin and a cap of a plastic bottle, in which a size (diameter) is standardized, can be adopted.

The calibration object 63 is imaged once by once individually by the unifocal camera 31 and the zoom camera 32, and when the unifocal camera 31 images the calibration object 63 by using the imaging element 5a, the image 63s of the calibration object 63 is formed as the first standard image 1b, and an image size thereof is the image size Ws.

Moreover, when the zoom camera 32 images the calibration object 63 by using the imaging element 5b, the image 63m of the calibration object 63 is formed as the reference image 2a, and an image size thereof is the image size Wm.

Note that obtainment of the image sizes Ws and Wm can be performed in a similar way to the field calibration A.

In FIG. 10, the optical axes 4a and 4b are displayed so as to coincide with each other in order to facilitate grasping of positional relationships regarding the respective optical centers 3a and 3b of the unifocal camera 31 and the zoom camera 32, among the imaging element 5a and the imaging element 5b and in addition, of the calibration object 63.

In the field calibration C, when the image sizes Ws and Wm, the actual size S, and in addition, the deviation amount d are obtained, the reference focal length fm is given by Expression (2).

[Expression 2]

$$fm = fs \times Wm/Ws + d \times Wm/S \quad (2)$$

Note that it is similar to Expression (1) that an arithmetic expression of the reference focal length fm in the field calibration A is not limited to Expression (2), and that it is possible to add a variety of correction coefficients and the like thereto, and so on.

Next, a description is made of an operation flow of the information processing device 200A, which is related to the field calibration C.

Figure 21:
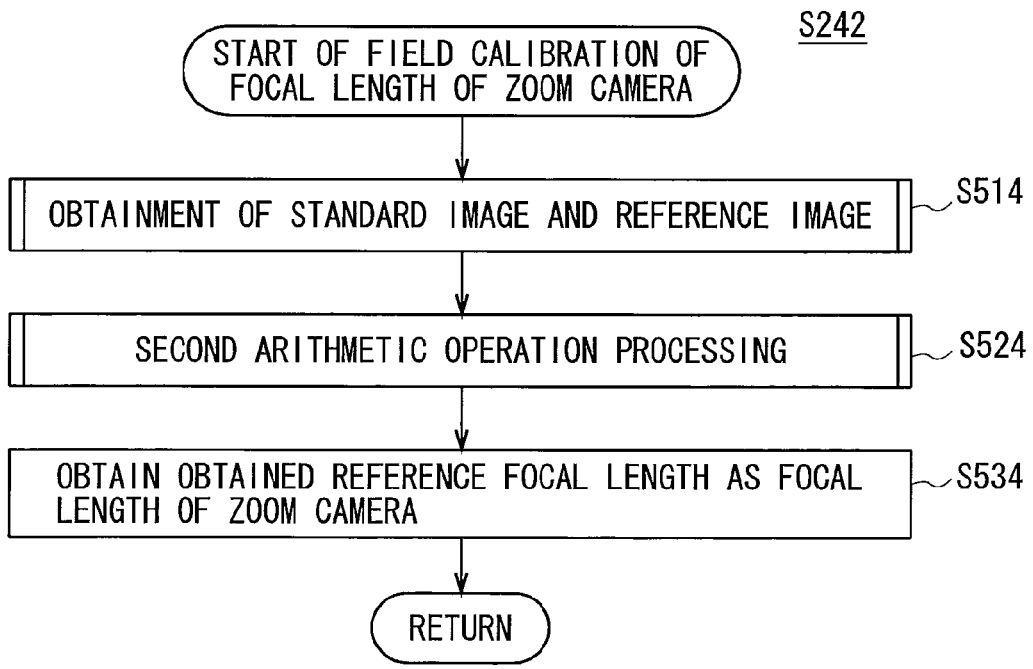
FIG. 21 is a view showing an example of the operation flow related to the field calibration of the focal length of the zoom camera in the operation flow of FIG. 16 or FIG. 19.

FIG. 21 is a view showing an example of an operation flow related to the field calibration (Step S242) of the focal length of the zoom camera 32 in the operation flow of FIG. 16 or FIG. 19, which will be described later, and is a view showing an example of an operation flow corresponding to the above-mentioned field calibration C.

Figure 26:
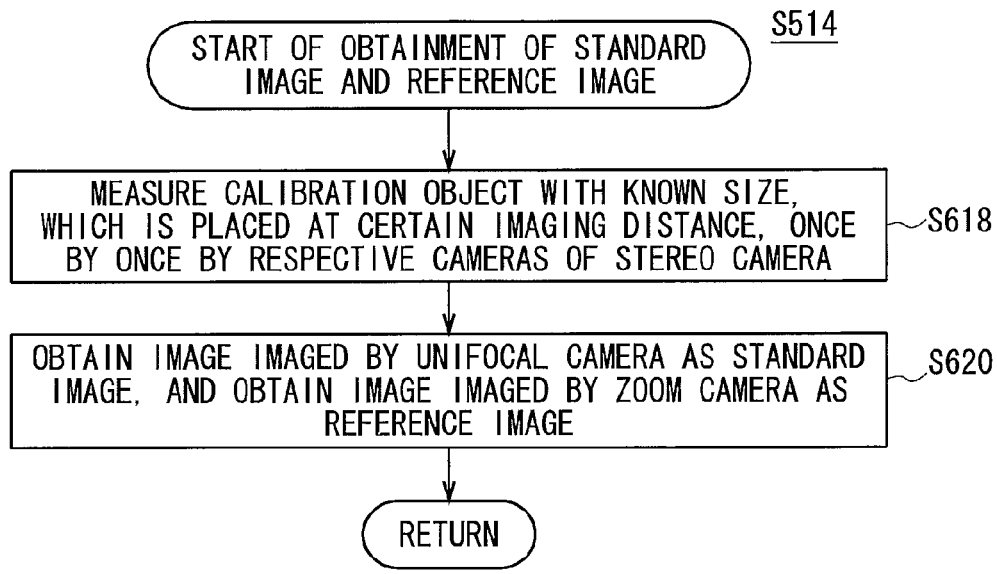
FIG. 26 is a view showing an example of an operation flow related to obtainment of a standard image and a reference image in the operation flow of FIG. 22.

Moreover, FIG. 26 is a view showing air example of an operation flow related to the obtainment (Step S514) of the standard image 1a and the reference image 2a in the field calibration C in the operation flow of FIG. 21.

When the processing shown in FIG. 21 is started in a state where the stereo camera 300B1 is connected to the information processing device 200A, the obtaining processing of the standard image 1a and the reference image 2a in Step S514 is started based on the specification information regarding the stereo camera 300B1, and the processing is shifted to Step S618 of FIG. 26.

In Step S618, by the control of the CPU 11A, the respective cameras of the stereo camera 300B1 measure the calibration object 63 with the known size, which is placed at a certain position, once by once.

Note that, at this time, by the control of the zoom control unit 17, the imaging optical system 9b of the zoom camera 32 is set in an imaging-time optical state having the unknown reference local length fm.

Moreover, in the imaging operations by the unifocal camera 31 and the zoom camera 32, both pieces of the imaging are performed in the state where the spatial relationship between the calibration object 63 and the imaging system (the unifocal camera 31 and the zoom camera 32) is kept in a similar way to the field calibration B.

Next, the focal length obtaining unit 13 obtains the image (first image g1), which the unifocal camera 31 of the stereo camera 300B1 images, and the image (second image g2), which the zoom camera 32 thereof images, as the standard image 1a (FIG. 10) and the reference image 2a (FIG. 10), respectively (Step S620).

Figure 31:
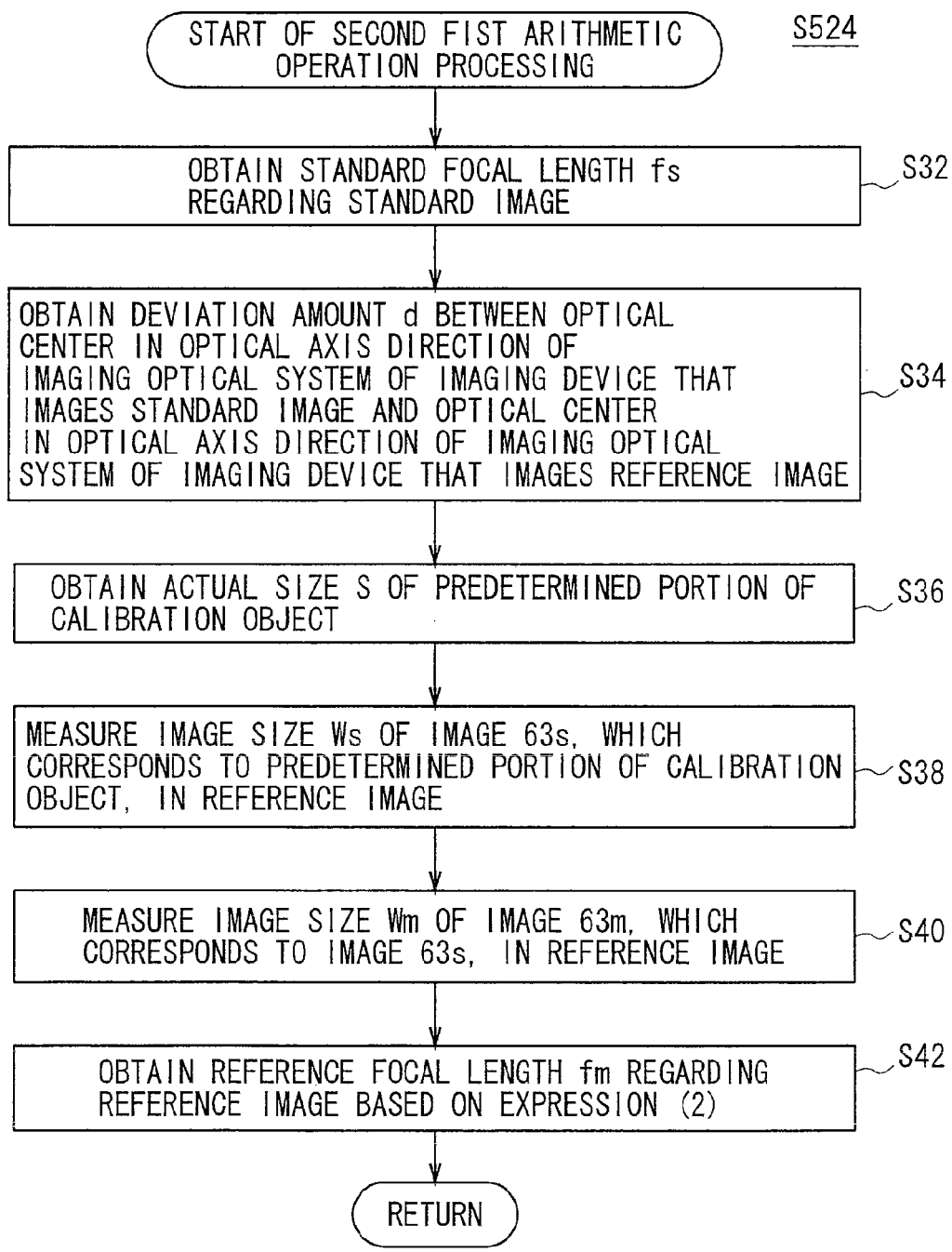
FIG. 31 is a view showing an example of an operation flow related to second arithmetic operation processing in the operation flow of FIG. 21.

When the standard image 1a and the reference image 2a are obtained, second arithmetic operation processing (S524 of FIG. 21) is started, and the processing is shifted to Step S32 of FIG. 31.

FIG. 31 is a view showing an example of an operation flow related to the second arithmetic operation processing (Step S524) in the operation flow of FIG. 21.

First, from the field calibrating information storage unit 47a, the focal length obtaining unit 13 obtains the standard focal length fs (FIG. 2, FIG. 10) as the focal length regarding the standard image 1a (Step S32).

From the field calibrating information storage unit 47a, the focal length obtaining unit 13 obtains the deviation amount d (FIG. 10) between the optical center 3a in the direction of the optical axis 4a of the imaging optical system 9a of the unifocal camera 31, which has imaged the standard image 1a, and the optical center 3b in the direction of the optical axis 4b of the imaging optical system 9b of the zoom camera 32, which has imaged the reference image 2a (Step S34).

The focal length obtaining unit 13 obtains the actual size S (FIG. 10) of a predetermined portion of the calibration object 63 (FIG. 10) from the field calibrating information storage unit 47a (Step S36).

The focal length obtaining unit 13 measures the image size Ws (FIG. 10) of the image 63s corresponding to the predetermined portion concerned of the calibration object 63 in the reference image 1a (Step S38).

The focal length obtaining unit 13 measures the image size Wm (FIG. 10) of the image 63m corresponding to the image 63s in the reference image 2a (Step S40).

Based on Expression (2), the focal length obtaining unit 13 obtains the reference focal length fm (FIG. 10) as the focal length regarding the reference image 2a (Step S42).

When the reference focal length fm is obtained, the processing is returned to FIG. 21, and the focal length obtaining unit 13 obtains the obtained reference focal length fm as the focal length of the zoom camera 32 in the stereo camera 300B1 (Step S534).

In accordance with the field calibration C, the calibration object with the known actual size is imaged at the unknown imaging distance once by once individually by the unifocal camera 31 and zoom camera 32 of the stereo camera 300B1 in the state where the spatial relationship thereof with the imaging system is kept, and the standard image 1a and the reference image 2a are obtained.

Then, by using the image sizes Ws and Wm of the calibration object 62 in the standard image 1a and the reference image 2a, the actual size S of the calibration object 63, and in addition, the known deviation amount d, Expression (21), that is, the arithmetic operation processing for scaling the value of the standard focal length fs is performed, whereby the value of the reference focal length fm is obtained.

Hence, in accordance with the field calibration C, in the stereo camera including the zoom camera, in the case where, with regard to the optical center of the imaging optical system having the known standard focal length fs when the standard image is obtained and the optical center of the imaging optical system having the unknown reference focal length fm when the reference image is obtained, the deviation amount d therebetween is known, and the actual size of the calibration target is known, the reference focal length fm can be obtained at a high speed based on the calibrating data obtainable in a short time under a simple measurement environment that does not require the information of the imaging distance of the calibration object, and then the calibration frequency of the stereo camera at the using site thereof can be enhanced.

Moreover, in accordance with the field calibration C, the unifocal camera 31 and the zoom camera 32 are used for the imaging, and accordingly, the standard image 1a and the first standard image 1b can be measured simultaneously or substantially simultaneously.

Hence, the standard image 1a and the first standard image 1b can be obtained in the state where the spatial relationship between the calibration object 63 and the imaging system (the unifocal camera 31 and the zoom camera 32) is kept, and the obtaining accuracy of the reference focal length fm can be enhanced.

Moreover, the unifocal camera 31 and the zoom camera 32 can image the calibration object simultaneously or substantially simultaneously, and accordingly, the moving object can be adopted as the calibration object.

Moreover, in accordance with the field calibration C, a predetermined region with the known size in the calibration object 63 is imaged once by once individually by the unifocal camera 31 and the zoom camera 32 simultaneously or substantially simultaneously, whereby the image data for the calibration can be obtained. Accordingly, in the case where the subject itself serving as the creation object of the pseudo image 53 has a feature portion to which the method described in FIG. 7 and FIG. 8 is applicable, then the subject itself can be adopted as the calibration object.

Note that, in the stereo camera 300B1, even if, in a similar way to the field calibration B regarding the stereo camera 300A2, the zoom camera 32 in which the focal length of the imaging optical system 9b is known, the zoom camera 32 being located at the end portion of the drive range of the imaging optical system 9b or at the position such as a proximity switch position, where the reproducibility of the position control of the imaging optical system 9b is high, is adopted as the imaging device that images the standard image 1a in place of the unifocal camera 31, the usefulness of the present invention is not damaged.

⊙ Field Calibrations D and E of Focal Length:

For example, field calibration D of the focal length is field calibration of the focal length of the stereo camera 32 or the like in the stereo camera 300 in which the deviation amount d (FIG. 3) is varied.

Moreover, for example, field calibration E of the focal length is field calibration of the focal length of the zoom camera 32 or the like in the stereo camera 300B (hereinafter, referred to as a "stereo camera 300B2") in which there is known the value of the focal length f2 of the imaging optical system 9b at the structural abutting position such as the end portion of the drive range where the imaging optical system 9b of the zoom camera 32 is concerned with the zoom, or at such a position where the optical state of the imaging optical system 9b is detectable by the positional sensor and the like, and the value concerned is suppliable to the information processing device 200A through the storage unit (not shown) provided in the inside of the stereo camera.

Note that the above-mentioned position (optical state) of the imaging optical system 9b, in which the value of the focal length f2 of the imaging optical system 9b is known, is a position where the reproducibility of the position control for the imaging optical system 9b is high.

FIG. 11 is a view explaining an example of obtainment of data for the field calibration D of the focal length in the stereo camera 300B (FIG. 3).

In FIG. 11, a state where one calibration object 64 is placed at two unknown imaging distances different from each other, and is measured for each of the imaging distances once by once individually by the respective cameras of the stereo camera 300B, and totally four images are measured for the field calibration is displayed on one drawing in order to intelligibly display an arrangement relationship between the optical centers 3a and 3b of the respective cameras.

Furthermore, in the display of FIG. 11, the optical axes 4a and 4b are displayed so as to coincide with each other in order to facilitate grasping of the positional relationships regarding the respective optical centers 3a and 3b of the unifocal camera 31 and the zoom camera 32, the imaging element 5a and the imaging element 5b, and the calibration object 64 for each set of the calibration object 64 and the stereo camera 300B, which are displayed on a left side of FIG. 11, and the calibration object 64 and the stereo camera 300B, which are displayed on a right side of FIG. 11.

The principal rays 6a and 6b, which are shown in FIG. 11, are the respective principal rays, which pass through the optical centers 3a and 3b, respectively, among reflected light coming from outer edge portions of the respective calibration objects 64 placed at two different imaging distances.

Here, first, a description is made of the stereo camera 300B that images the calibration object 64 displayed on the left side of FIG. 11.

In the left side drawing of FIG. 11, the first standard image 1b is an image in which the unifocal camera 31 images the calibration object 64 by the imaging element 5a, and an image 64s1 is an image of the calibration object 64 in the first standard image 1b. Moreover, an image size Ws1 is an image size of the image 64s1.

Moreover, the first reference image 2b is an image in which the zoom camera 32 images the calibration object 64 by the imaging element 5b, and an image 64m1 is an image of the calibration object 64 in the first reference image 2b. An image size of the image 64m1 is an image size Wm1.

Here, for the first standard image 1b and the first reference image 2b, for example, the unifocal camera 31 and the zoom camera 32 perform the imaging simultaneously or substantially simultaneously, whereby the imaging is performed in a state where a spatial relationship between the calibration object 64 and the imaging system (the unifocal camera 31 and the zoom camera 32) is kept.

Next, a description is made of the stereo camera 300B that images the calibration object 64 displayed on the right side of FIG. 11.

Note that the calibration object 64 displayed on the right-side drawing of FIG. 11 is arranged on a negative side in the Z-axis direction with respect to the calibration object 64 displayed on the left-side drawing of FIG. 11, and is imaged at a closer imaging distance than the calibration object 64 on the left side of FIG. 11.

Note that the calibration object 64 displayed on the right-side drawing of FIG. 11 may be arranged on a positive side in the Z-axis direction with respect to the calibration object 64 displayed on the left-side drawing of FIG. 11.

In the right-side drawing of FIG. 11, the second standard image 1c is an image in which the unifocal camera 31 images the calibration object 64 by the imaging element 5a, and an image 64s2 is an image of the calibration object 64 in the second standard image 1c. Moreover, an image size of the image 64s2 is an image size Ws2.

Moreover, the second reference image 2c is an image in which the zoom camera 32 images the calibration object 64 by the imaging element 5b, and an image 64m2 is an image of the calibration object 64 in the second reference image 2c. An image size measured from the image 64m2 is an image size Wm2.

Here, for the second standard image 1c and the second reference image 2c, for example, the unifocal camera 31 and the zoom camera 32 perform the imaging simultaneously or substantially simultaneously, whereby the imaging is performed in the state where the spatial relationship between the calibration object 64 and the imaging system (the unifocal camera 31 and the zoom camera 32) is kept.

Note that, in FIG. 11, one calibration object 64 is placed at two different imaging distances, and for each of the imaging distances, is sequentially imaged by the stereo camera 300B; however, even if both of two calibration objects with the same or substantially same size, which are placed at imaging distances different from each other, are imaged once by once by the unifocal camera 31 and zoom camera 32 of the stereo camera 300B, respectively, the usefulness of the present invention is not damaged since the above-mentioned image sizes Ws1 and Ws2 and image sizes Wm1 and Wm2 can be obtained from the totally two images thus imaged.

FIG. 12 is a view explaining an example of obtainment of data for the field calibration E of the focal length, which is performed by using the stereo camera 300B2.

In FIG. 12, in a similar way to FIG. 11, a state where the calibration object 64 is placed at two unknown imaging distances different from each other, is measured for each of the imaging distances twice by twice only by the zoom camera 32 in the stereo camera 300B, and totally four images are measured for the field calibration is displayed on one drawing in order to intelligibly display an arrangement relationship between the optical centers 3a and 3b of the respective cameras.

Note that the zoom camera 32 is used for imaging the calibration object 64 in the respective optical states, which are: the optical state where the zoom camera 32 is located at the position where the reproducibility of the position control of the imaging optical system 9b is high, such as the end portion of the drive range of the imaging optical system 9b and the proximity switch position, and the focal length is the known standard focal length fs; and the optical state where the focal length is the unknown reference focal length fm by the zooming.

Moreover, in the display of FIG. 12, the optical axes 4b regarding the two different focal lengths are displayed so as to coincide with each other in order to facilitate grasping of the positional relationships regarding the respective optical centers 3b of the zoom camera 32 having the two different focal lengths, the imaging elements 5b, and the calibration object 64 for each set of the calibration object 64 and the zoom camera 32, which are displayed on a left side of FIG. 12, and the calibration object 64 and the zoom camera 32, which are displayed on a right side of FIG. 12.

In the left-side drawing of FIG. 12, the first standard image 1b is an image in which the zoom camera 32 having the known standard focal length fs images the calibration object 64 by the imaging element 5b, and an image 64s1 is an image of the calibration object 64 in the first standard image 1b. Moreover, an image size Ws1 is an image size of the image 64s1.

Moreover, the first reference image 2b is an image in which the zoom camera 32 having the unknown reference focal length fm images the calibration object 64 by the imaging element 5b, and an image 64m1 is an image of the calibration object 64 in the first reference image 2b. Moreover, an image size of the image 64m1 is an image size Wm1.

Here, for the first standard image 1b and the first reference image 2b, for example, the zoom camera 32 having the respective focal lengths performs the imaging in a state where the calibration object 64 stands relatively still with respect to the zoom cameras 32, whereby the imaging is performed in a state where a spatial relationship between the calibration object 64 and the imaging system (the zoom camera 32) is kept.

Next, a description is made of the stereo camera 300B that images the calibration object 64 displayed on the right side of FIG. 12.

Note that, in a similar way to the case of FIG. 11, the calibration object 64 displayed on the right-side drawing of FIG. 12 is imaged at a closer imaging distance than the calibration object 64 on the left side of FIG. 12.

In the right-side drawing of FIG. 12, the second standard image 1c is an image in which the zoom camera 32 having the known standard focal length fs images the calibration object 64 by the imaging element 5a, and an image 64s2 is an image of the calibration object 64 in the second standard image 1c. Moreover, an image size of the image 64s2 is the image size Ws2.

Moreover, the second reference image 2c is an image in which the zoom camera 32 having the unknown reference focal length fm images the calibration object 64 by the imaging element 5b, and an image 64m2 is an image of the calibration object 64 in the second reference image 2c. An image size measured from the image 64m2 is the image size Wm2.

Here, in a similar way to the case of the left side of FIG. 12, the imaging is performed in the state where the spatial relationship between the calibration object 64 and the imaging system (the zoom camera 32) is kept.

Moreover, also in FIG. 12, in a similar way to the case of FIG. 11, even if two calibration objects with the same or substantially same size, which are placed at imaging distances different from each other, are imaged simultaneously for each of the optical states of the zoom camera 32 having different focal lengths, the usefulness of the present invention is not damaged.

When the image sizes Ws1, Ws2, Wm1 and Wm2 are obtained in the field calibration D or the field calibration E, the reference focal length fm is given by Expression (3) by using the respective image sizes and the standard focal length fs stored in the field calibrating information storage unit 47a.

[Expression 3]

$$fm = fs \times (1/Ws2 - 1/Ws1)/(1/Wm2 - 1/Wm1) \quad (3)$$

Note that an arithmetic expression of the reference focal length fm in the field calibrations D and E is not limited to Expression (3), and in a similar way to the field calibration A, for example, even if the distortion correction coefficient, the coefficient for the collimation processing, and the like are appropriately added to Expression (3) in response to the desired accuracy of the reference focal length fm, the usefulness of the present invention is not damaged.

Next, a description is made of an operation flow of the information processing device 200A, which is related to the field calibrations D and E.

Figure 22:
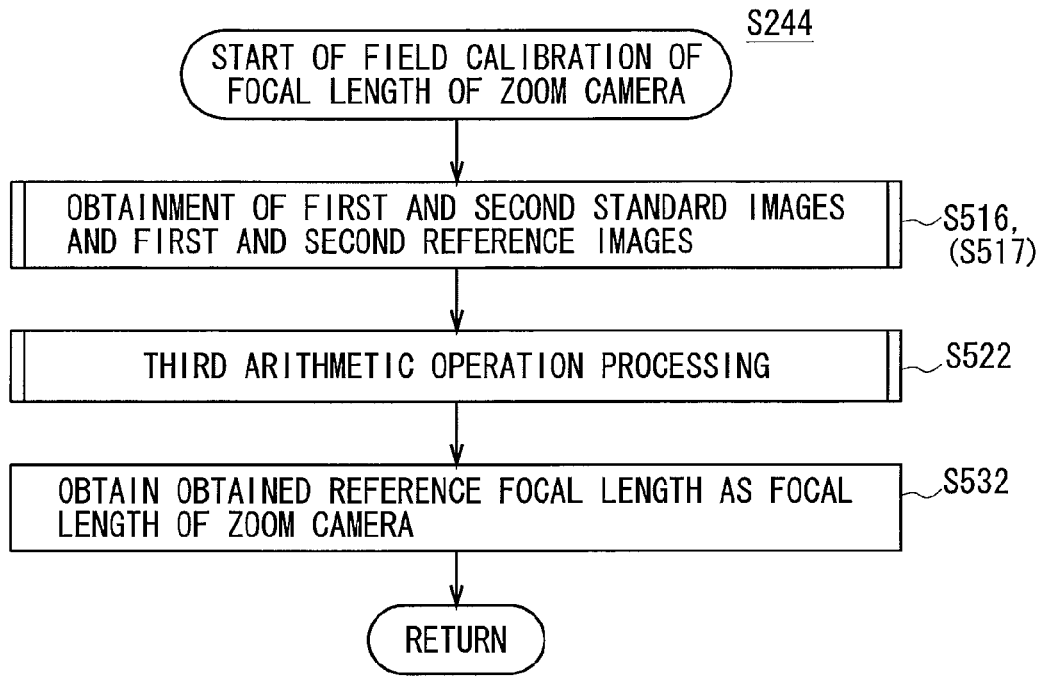
FIG. 22 is a view showing an example of the operation flow related to the field calibration of the focal length of the zoom camera in the operation flow of FIG. 16 or FIG. 19.

FIG. 22 is a view showing an example of an operation flow related to the field calibration (Step S244) of the focal length of the zoom camera 32 in the operation flow of FIG. 16 or FIG. 19, which will be described later, and is a view showing an example of an operation flow corresponding to the above-mentioned field calibrations D and E.

Figure 27:
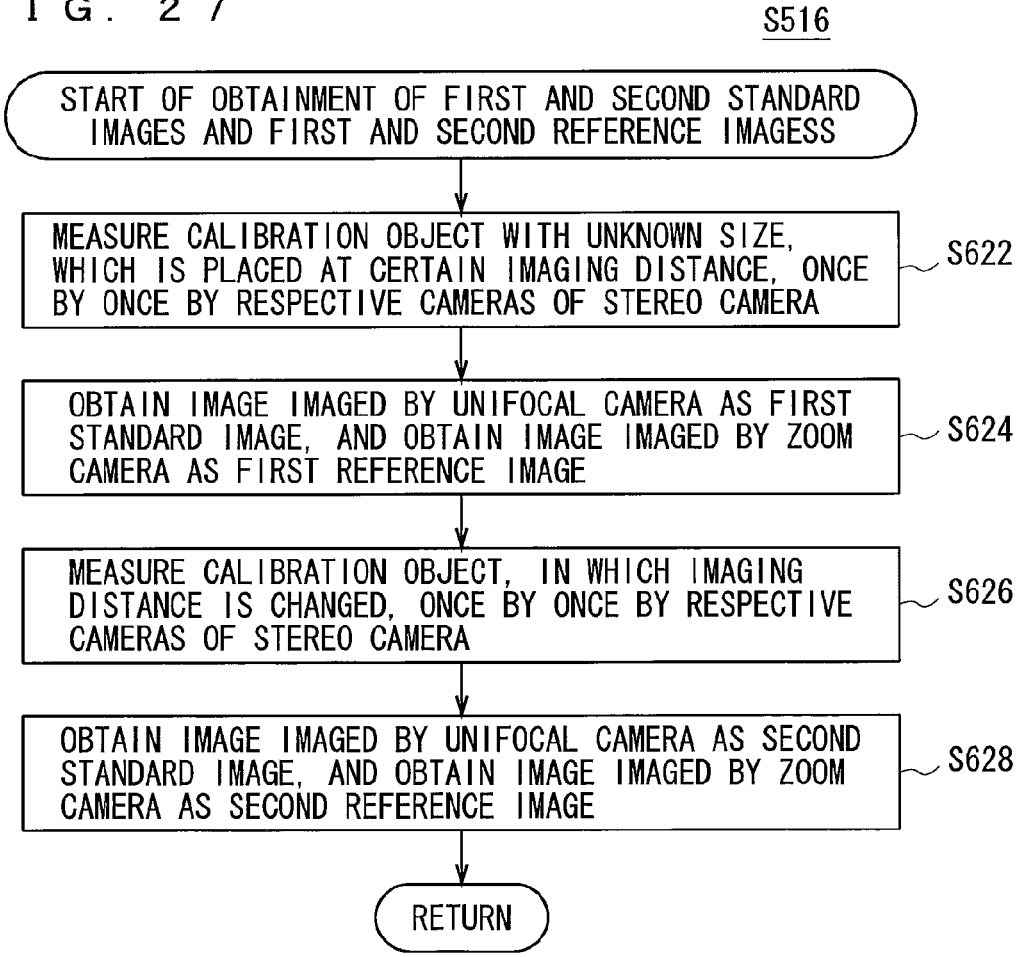
FIG. 27 is a view showing an example of an operation flow related to obtainment of first and second standard images and first and second reference images in the operation flow of FIG. 21.

Moreover, FIG. 27 is a view showing an example of an operation flow related to the obtainment (Step S516) of the first standard image 1b, the second standard image 1c, the first reference image 2b and the second reference image 2c in the field calibration D in the operation flow of FIG. 22.

When the processing shown in FIG. 22 is started in a state where the stereo camera 300B is connected to the information processing device 200A, then based on the specification information regarding the stereo camera 300B, the CPU 11A displays that it is possible to implement the field calibration D or F (described later) on the display unit 43, and in accordance with calibration method specification information in which the operator selects the field calibration D, obtainment processing of the respective images in Step S516 is started, and the processing is shifted to Step S622 of FIG. 27.

In Step S622, by the control of the CPU 11A, the respective cameras of the stereo camera 300B measure the calibration object 64 with an unknown size, which is placed at a certain position, once by once.

Note that, at this time, the imaging optical system 9b of the zoom camera 32 is set in the imaging-time optical state having the unknown reference focal length fm by the control of the zoom control unit 17.

Moreover, in the imaging by the unifocal camera 31 and the imaging by the zoom camera 32, for example, the imaging by the unifocal camera 31 and the imaging by the zoom camera 32 are performed simultaneously or substantially simultaneously, whereby both pieces of the imaging are performed in the state where the spatial relationship between the calibration object 64 and the imaging system (the unifocal camera 31 and the zoom camera 32) is kept.

The focal length obtaining unit 13 obtains the image (the first image g1), which is imaged by the unifocal camera 31 of the stereo camera 300A1, and the image (the second image g2), which is imaged by the zoom camera 32 thereof, as the first standard image 1b (FIG. 11) and the first reference image 2b (FIG. 11), respectively (Step S624).

By the control of the CPU 11A, the respective cameras of the stereo camera 300A measure the calibration object, in which a placed position is moved, once by once (Step S626).

The focal length obtaining unit 13 obtains the image, which is imaged by the unifocal camera 31, as the second standard image 1c, and obtains the image, which is imaged by the zoom camera 32, as the second reference image 2c (Step S628).

Figure 32:
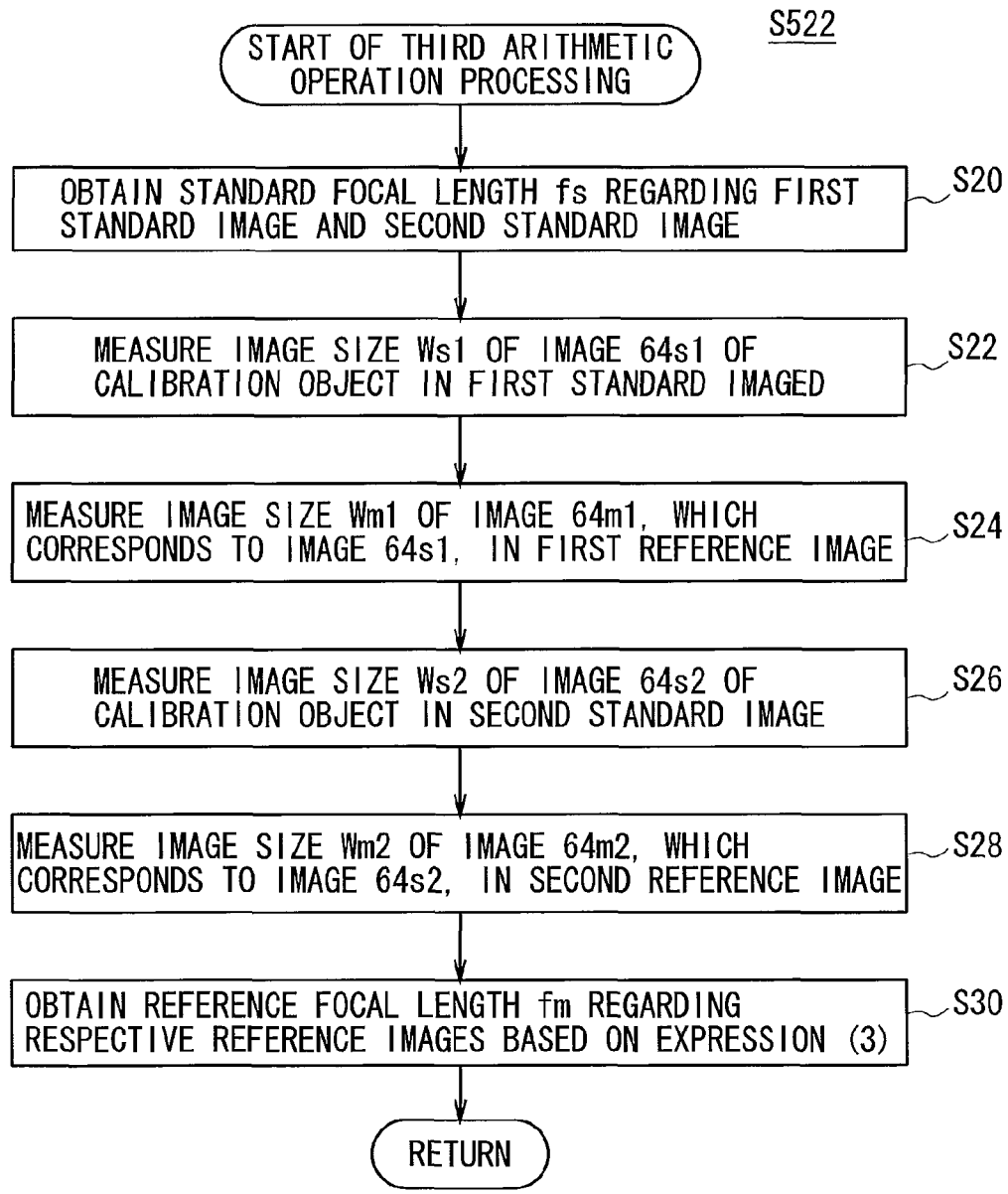
FIG. 32 is a view showing an example of an operation flow related to third arithmetic operation processing in the operation flow of FIG. 22.

When the first standard image 1b, the second standard image 1c, the first reference image 2b and the second reference image 2c are obtained, third arithmetic operation processing (Step S522 of FIG. 22) is started, and the processing is shifted to Step S20 of FIG. 32.

Figure 28:
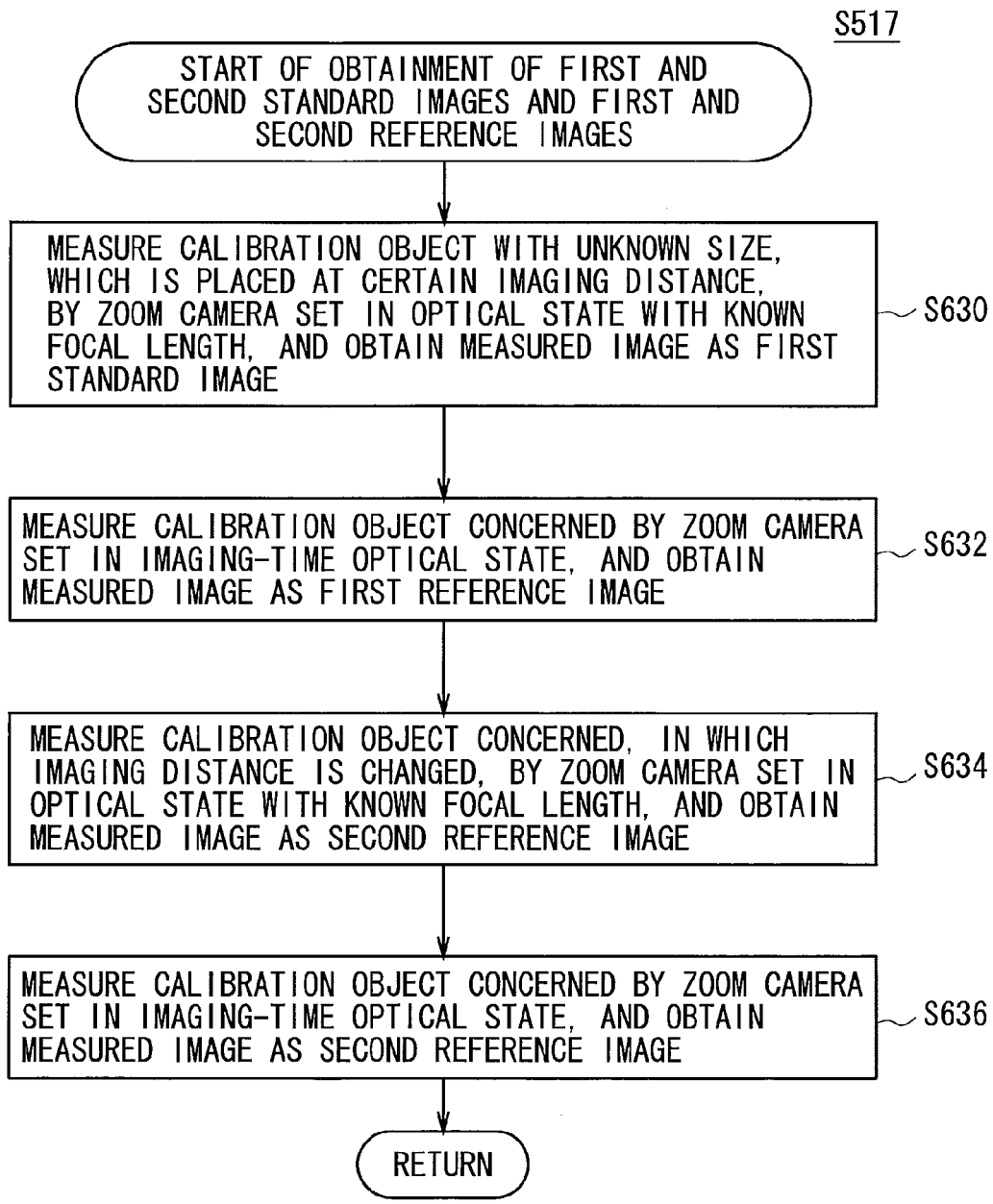
FIG. 28 is a view showing an example of the operation flow related to the obtainment of the first and second standard images and the first and second reference images in the operation flow of FIG. 21.

Moreover, FIG. 28 is a view showing an example of an operation flow related to the obtainment (Step S517) of the first standard image 1b, the second standard image 1c, the first reference image 2b and the second reference image 2c in the field calibration E in the operation flow of FIG. 22.

When the processing shown in FIG. 22 is started in the state where the stereo camera 300B2 is connected to the information processing device 200A, then based on the specification information regarding the stereo camera 300B2, obtainment processing of the first standard image 1b, the second standard image 1c, the first reference image 2b and the second reference image 2c in Step S517 is started, and the processing is shifted to Step S630 of FIG. 28.

In Step S630, first, the zoom control unit 17 controls the zooming of the zoom camera 32 of the stereo camera 300B2, and varies the state of the imaging optical system 9b to the optical state having the known standard focal length fs (FIG. 12).

By the control of the CPU 11A, the zoom camera 32 concerned measures the calibration object 64 with an unknown size, which is placed at a certain position, once.

The focal length obtaining unit 13 obtains the image (the second image g2), which is imaged by the zoom camera 32 concerned, as the first standard image 1b (FIG. 12).

The zoom control unit 17 controls the zooming of the zoom camera 32, and sets the imaging optical system 9b in the imaging-time optical state having the unknown reference focal length fm.

By the control of the CPU 11A, the zoom camera 32 measures the calibration object 64, and the focal length obtaining unit 13 obtains the measured image (the second image g2) as the first reference image 2b (Step S632).

Note that, also in the field calibration E, the obtainment of the first standard image 1b and the first reference image 2b is performed in the state where spatial relationship between the calibration object and each imaging system is kept, and accordingly, the first standard image 1b and the first reference image 2b are imaged in the state where the calibration object 64 stands relatively still with respect to the zoom camera 32.

Moreover, here, the description has been made of the example of first imaging the first standard image 1b; however, even if the first reference image 2b is first imaged, the usefulness of the present invention is not damaged.

The zoom control unit 17 controls the zooming of the zoom camera 32 of the stereo camera 300B2, and varies the state of the imaging optical system 9b to the optical state having the known standard focal length fs (FIG. 12) one more time.

By the control of the CPU 11A, the zoom camera 32 concerned measures the calibration object 64, which is placed at a difference imaging position, once, and the focal length obtaining unit 13 obtains the image (the second image g2), which is imaged by the zoom camera 32 concerned, as the second standard image 1c (FIG. 12) (Step S634).

The zoom control unit 17 controls the zooming of the zoom camera 32, and sets the imaging optical system 9b in the imaging-time optical state having the unknown reference focal length fm one more time.

By the control of the CPU 11A, the zoom camera 32 measures the calibration object 64, and the focal length obtaining unit 13 obtains the measured image (the second image g2) as the second reference image 2c (Step S636).

Note that, also in the field calibration E, the obtainment of the second standard image 1c and the second reference image 2c is performed in the state where the spatial relationship between the calibration object and each imaging system is kept, and accordingly, the second standard image 1c and the second reference image 2c are imaged in the state where the calibration object 64 stands relatively still with respect to the zoom camera 32.

Moreover, here, the description has been made of the example of first imaging the second standard image 1c; however, even if the second reference image 2c is first imaged, the usefulness of the present invention is not damaged.

When the first standard image 1b, the second standard image 1c, the first reference image 2b and the second reference image 2c are obtained, the third arithmetic operation processing (Step S522 of FIG. 22) is started, and the processing is shifted to Step S20 of FIG. 32.

FIG. 32 is a view showing an example of an operation flow related to the third arithmetic operation processing (Step S522) in the operation flow of FIG. 22.

First, the focal length obtaining unit 13 obtains the standard focal length fs (FIG. 2, FIG. 11, FIG. 12), which is the focal length regarding the first standard image 1b (FIG. 2, FIG. 11, FIG. 12) and the second standard image 1c (FIG. 2, FIG. 11, FIG. 12), from the field calibrating information storage unit 47a (Step S20).

The focal length obtaining unit 13 measures the image size Ws1 (FIG. 11, FIG. 12) of the image 64s1 (FIG. 11, FIG. 12) of the calibration object 64 (FIG. 11, FIG. 12) in the first reference image 1b (Step S22).

The focal length obtaining unit 13 measures the image size Wm1 (FIG. 11, FIG. 12) of the image 64m1 (FIG. 11, FIG. 12) corresponding to the image 64s1 in the first reference image 2b (Step S24).

The focal length obtaining unit 13 measures the image size Ws2 (FIG. 11, FIG. 12) of the image 64s2 (FIG. 11, FIG. 12) of the calibration object 64 in the second standard image 1c (Step S26).

Next, focal length obtaining unit 13 measures the image size Wm2 (FIG. 11, FIG. 12) of the image 64m2 corresponding to the image 64s2 in the second reference image 2c (Step S28).

The focal length obtaining unit 13 obtains the reference focal length fm, which is the focal length regarding each reference image, based on Expression (3) (Step S30).

The processing is returned to FIG. 22, and the focal length obtaining unit 13 obtains the obtained reference focal length fm as the focal length of the zoom camera 32 in the stereo camera 300B or 300B2 (Step S532).

In accordance with the field calibration D or the field calibration E, the calibration object 64 with the unknown actual size is imaged individually at the two different unknown imaging distances in the state where the spatial relationship thereof with the imaging system is kept, and the first standard image 1b, the first reference image 2b, the second standard image 1c and the second reference image 2c are obtained.

Then, by using the image sizes Ws1 and Wm1 of the calibration object 64 in the first standard image 1b and the first reference image 2b and the image sizes Ws2 and Wm2 of the calibration object 64 in the second standard image 1c and the second reference image 2c, Expression (3), that is, the arithmetic operation processing for scaling the value of the standard focal length fs is performed, whereby the value of the reference focal length fm can be obtained.

Hence, in accordance with the field calibration D or the field calibration E, in the stereo camera including the zoom camera, even in the case where, with regard to the optical center of the imaging optical system having the known standard focal length fs when the standard image is obtained and the optical center of the imaging optical system having the unknown reference focal length fm when the reference image is obtained, the deviation amount d therebetween is unknown, the reference focal length fm can be obtained at a high speed based on the calibrating data obtainable in a short time under the simple measurement environment that does not require the information of the imaging distance and actual size of the calibration object, and then the calibration frequency of the stereo camera at the using site thereof can be enhanced.

In accordance with the field calibration D, the unifocal camera 31 and the zoom camera 32 are used for the imaging, and accordingly, the first standard image 1b, the first reference image 2b, and in addition, the second standard image 1c and the second reference image 2c can be individually measured simultaneously or substantially simultaneously.

Hence, it becomes easy to obtain the standard image 1a and the first standard image 1b in the state where the spatial relationship between the calibration object 64 and the imaging system (the unifocal camera 31 and the zoom camera 32) is kept, and the obtaining accuracy of the reference focal length fm can be enhanced.

Moreover, in accordance with the field calibration D, the unifocal camera 31 and the zoom camera 32 can image the calibration object simultaneously or substantially simultaneously, and accordingly, a moving object can be adopted as the calibration object.

Moreover, in accordance with the field calibration D, regions with the same size in the calibration object 64 are individually imaged once by once by the unifocal camera 31 and the zoom camera 32 simultaneously or substantially simultaneously in a state where the calibration object 64 is placed at the different position, whereby the image data for the calibration can be obtained. Accordingly, in such a case where the subject itself serving as the creation object of the pseudo image 53 has a feature portion to which the method described in FIG. 7 and FIG. 8 is applicable, then the subject itself can be adopted as the calibration object, and the calibration frequency can be enhanced.

⊙ Field Calibration F of Focal Length:

In a similar way to the field calibration D, field calibration F of the focal length is field calibration of the focal length of the zoom camera 32 in the stereo camera in which the deviation amount d (FIG. 3) is varied. However, in the field calibration F, the value of the deviation amount d can also be obtained.

Figure 13:
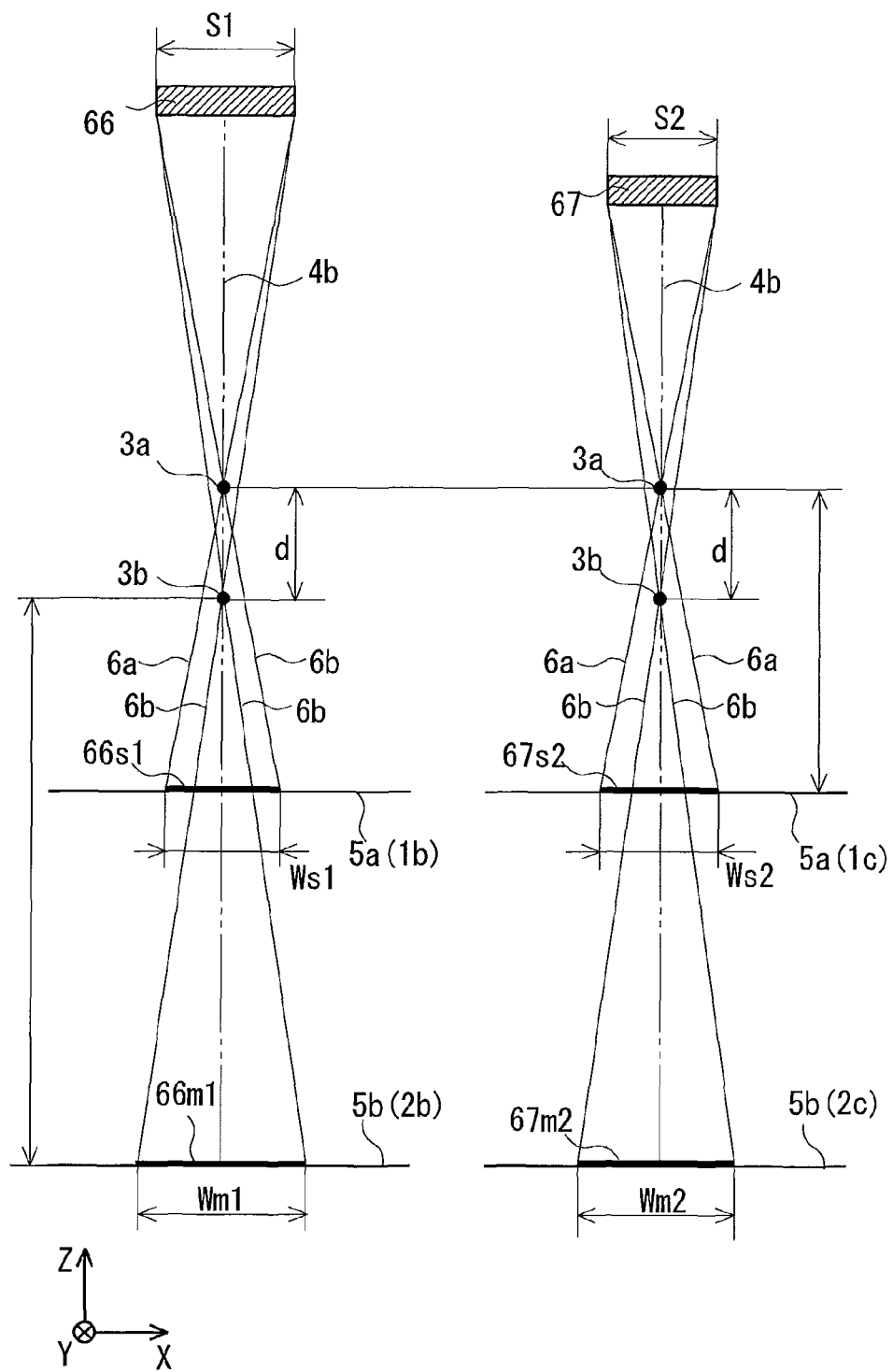
FIG. 13 is a view explaining an example of the obtainment of the data for the field calibration of the focal length.

FIG. 13 is a view explaining an example of obtainment of data for the field calibration F of the focal length in the stereo camera 300B (FIG. 3).

In FIG. 13, a first calibration object 66, in which an actual size is the known actual size S1, and a second calibration object 67, in which an actual size is the known actual size S2, are placed at two unknown imaging distances different from each other, each of the calibration objects is measured once by once individually by the respective cameras of the stereo camera 300B, and totally four images are displayed on one drawing in order to intelligibly display an arrangement relationship between the optical centers 3a and 3b of the respective cameras.

Furthermore, in the display of FIG. 13, the optical axes 4a and 4b are displayed so as to coincide with each other in order to facilitate grasping of positional relationships regarding the respective optical centers 3a and 3b of the unifocal camera 31 and the zoom camera 32, the imaging element 5a and the imaging element 5b, and the respective first and second calibration objects for each set of the first calibration object 66 and the stereo camera 300B, which are displayed on a left side of FIG. 13, and the second calibration object 67 and the stereo camera 300B, which are displayed on a right side of FIG. 13.

The principal rays 6a and 6b, which are shown in FIG. 13, are the respective principal rays, which pass through the optical centers 3a and 3b, respectively, among reflected light coming from the respective outer edge portions of the first and second calibration objects 66 and 67 placed at two different imaging distances.

Here, first, a description is made of the stereo camera 300B that images the first calibration object 66 displayed on the left side of FIG. 13.

In the left side drawing of FIG. 13, the first standard image 1b is an image in which the unifocal camera 31 images the first calibration object 66 by the imaging element 5a, and an image 66s1 is an image of the first calibration object 66 in the first standard image 1b. Moreover, the image size Ws1 is an image size of the image 66s1.

Moreover, the first reference image 2b is an image in which the zoom camera 32 images the first calibration object 66 by the imaging element 5b, and an image 66m1 is an image of the first calibration object 66 in the first reference image 2b. An image size of the image 66m1 is the image size Wm1.

Here, for the first standard image 1b and the first reference image 2b, for example, the unifocal camera 31 and the zoom camera 32 perform the imaging simultaneously or substantially simultaneously, whereby the imaging is performed in a state where a spatial relationship between the first calibration object 66 and the imaging system (the unifocal camera 31 and the zoom camera 32) is kept.

Next, a description is made of the stereo camera 300B that images the second calibration object 67 displayed on the right side of FIG. 13.

The second calibration object 67 displayed on the right-side drawing of FIG. 13 is arranged on a negative side in the Z-axis direction with respect to the first calibration object 66 displayed on the left-side drawing of FIG. 13, and is imaged at a closer imaging distance than the first calibration object 66 on the left side of FIG. 13.

Note that the first calibration object 66 may be arranged on the negative side in the Z-axis direction with respect to the second calibration object 67.

In the right-side drawing of FIG. 13, the second standard image 1c is an image in which the unifocal camera 31 images the second calibration object 67 by the imaging element 5a, and an image 67s2 is an image of the second calibration object 67 in the second standard image 1c. Moreover, an image size of the image 67s2 is the image size Ws2.

Moreover, the second reference image 2c is an image in which the zoom camera 32 images the second calibration object 67 by the imaging element 5b, and an image 67m2 is an image of the second calibration object 67 in the second reference image 2c. An image size measured from the image 67m2 is the image size Wm2.

Here, for the second standard image 1c and the second reference image 2c, for example, the unifocal camera 31 and the zoom camera 32 perform the imaging simultaneously or substantially simultaneously, whereby the imaging is performed in the state where the spatial relationship between the second calibration object 67 and the imaging system (the unifocal camera 31 and the zoom camera 32) is kept.

Note that, in FIG. 13, the first and second calibration object 66 and 67 are placed at imaging distances different from each other, and for each of the calibration objects, is sequentially imaged by the stereo camera 300B; however, even if both of the first calibration object 66 and 67, which are placed at the imaging distances different from each other, are imaged once by once by the unifocal camera 31 and zoom camera 32 of the stereo camera 300B, respectively, the usefulness of the present invention is not damaged since the above-mentioned image sizes Ws1 and Ws2 and image sizes Wm1 and Wm2 can be obtained from the totally two images thus imaged.

In the field calibration F, when the image sizes Ws1, Ws2, Wm1 and Wm2, the actual sizes S1 and S2 and the standard focal length fs are obtained, the reference focal length fm is given by Expression (4).

[Expression 4]

$$fm = fs \times (S2/Ws2 - S1/Ws1)/(S2/Wm2 - S1/Wm1) \quad (4)$$

Note that an arithmetic expression of the reference focal length fm in the field calibration F is not limited to Expression (4), and in a similar way to the field calibration A, for example, even if the distortion correction coefficient, the coefficient for the collimation processing, and the like are appropriately added to Expression (4) in response to the desired accuracy of the reference focal length fm, the usefulness of the present invention is not damaged.

Moreover, in the stereo camera 300B, even if, in a similar way to the field calibration B regarding the stereo camera 300A2, the zoom camera 32 in which the focal length of the imaging optical system 9b is known, the zoom camera 32 being located at the end portion of the drive range of the imaging optical system 9b or at the position such as a proximity switch position, where the reproducibility of the position control of the imaging optical system 9b is high, is adopted as the imaging device that images the first standard image 1b and the second standard image 1c in place of the unifocal camera 31, the usefulness of the present invention is not damaged.

Moreover, as each of the first calibration object 66 and the second calibration object 67, specifically, besides a calibrating chart designed exclusively, for example, a cylindrical one such as a coin and a cap of a plastic bottle, in which a size (diameter) is standardized, can be adopted.

Next, a description is made of an operation flow of the information processing device 200A, which is related to the field calibration F.

Figure 23:
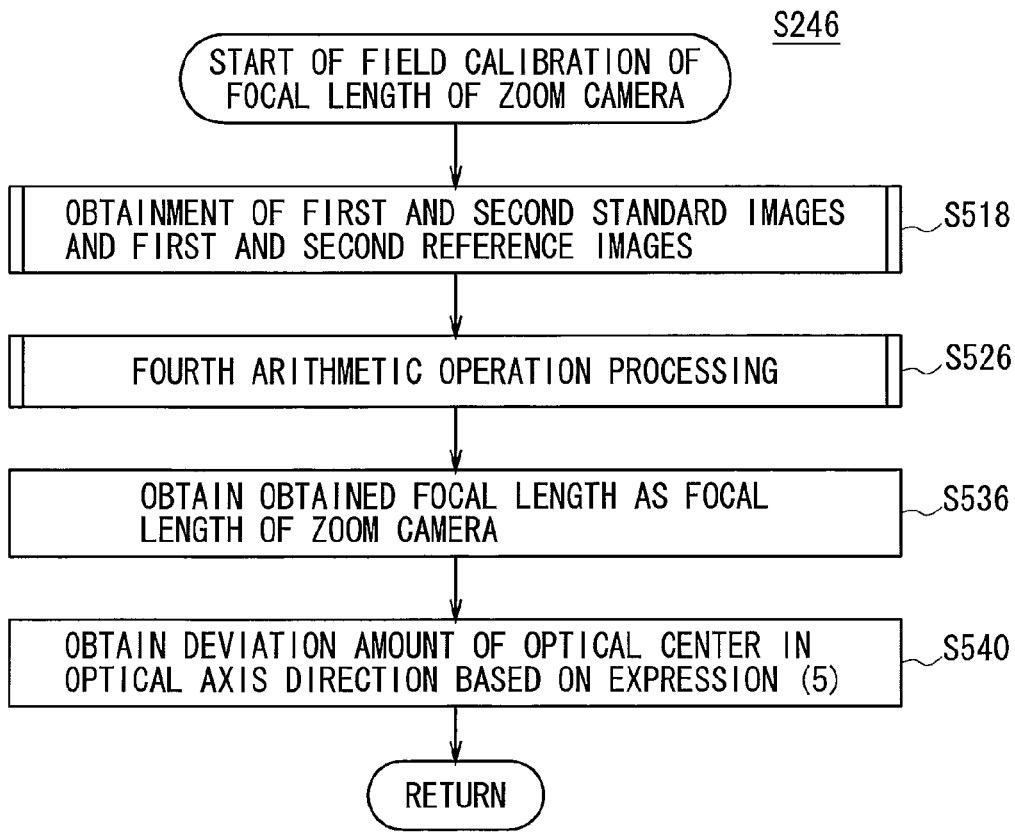
FIG. 23 is a view showing an example of the operation flow related to the field calibration of the focal length of the zoom camera in the operation flow of FIG. 16 or FIG. 19.

FIG. 23 is a view showing an example of an operation flow related to the field calibration (Step S246) of the focal length of the zoom camera 32 in the operation flow of FIG. 16 or FIG. 19, which will be described later, and is a view showing an example of an operation flow corresponding to the above-mentioned field calibration F.

Figure 29:
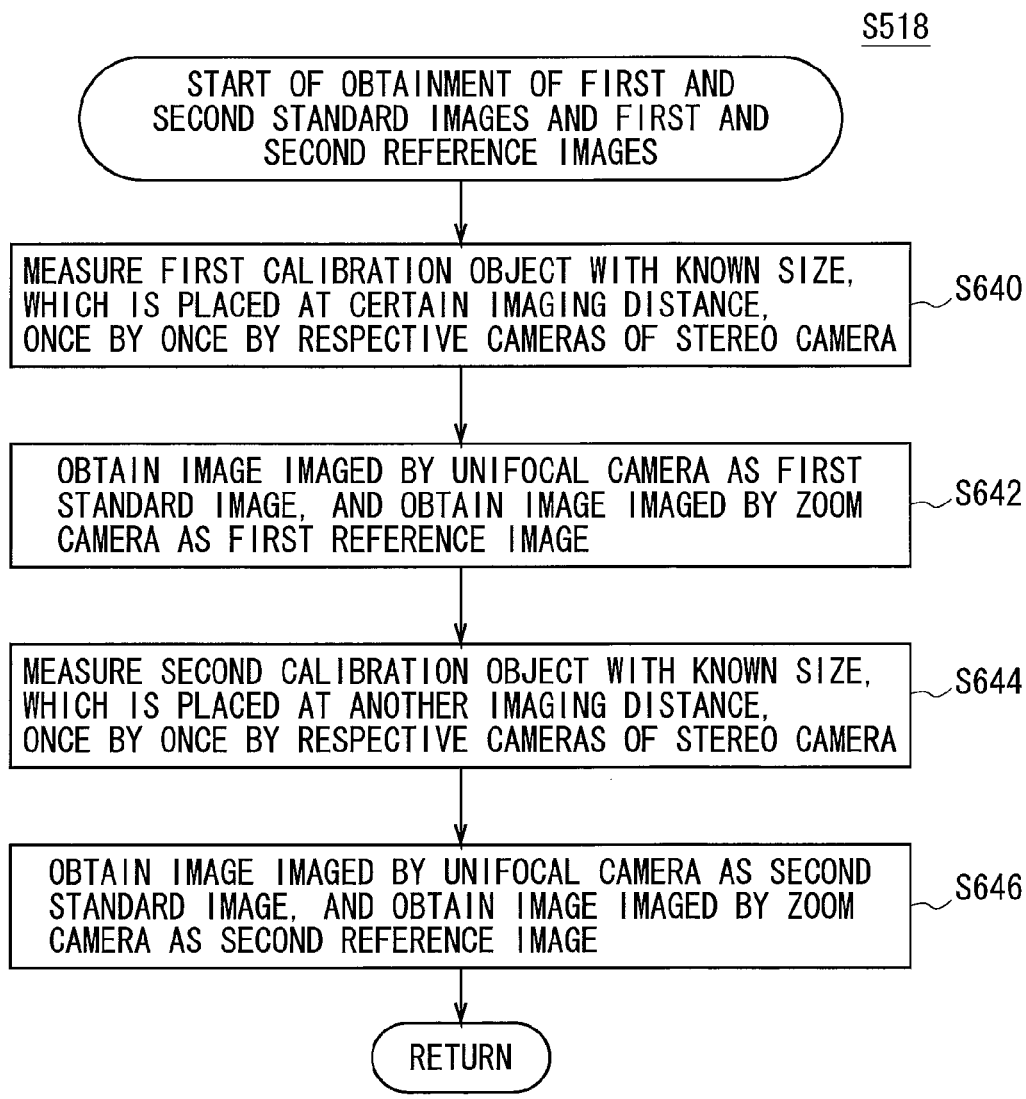
FIG. 29 is a view showing an example of an operation flow related to obtainment of first and second standard images and first and second reference images in the operation flow of FIG. 23.

Moreover, FIG. 29 is a view showing an example of an operation flow related to the obtainment (Step S518) of the first standard image 1b, the second standard image 1c, the first reference image 2b, and the reference image 2c in the field calibration E in the operation flow of FIG. 23.

When the processing shown in FIG. 20 is started in a state where the stereo camera 300B is connected to the information processing device 200A, then based on the specification information regarding the stereo camera 300B, the CPU 11A displays that it is possible to implement the field calibration D or F on the display unit 43, and in accordance with calibration method specification information in which the operator selects the field calibration F, obtainment processing of the respective images in Step S518 is started, and the processing is shifted to Step S640 of FIG. 29.

In Step S640, by the control of the CPU 11A, the respective cameras of the stereo camera 300B measure the first calibration object 66, which is placed at a certain unknown imaging distance, once by once.

Note that, at this time, the imaging optical system 9b of the zoom camera 32 is set in the imaging-time optical state having the unknown reference focal length fm by the control of the zoom control unit 17.

Moreover, in the imaging by the unifocal camera 31 and the imaging by the zoom camera 32, for example, the imaging by the unifocal camera 31 and the imaging by the zoom camera 32 are performed simultaneously or substantially simultaneously, and so on, whereby both pieces of the imaging are performed in the state where the spatial relationship between the first calibration object 66 and the imaging system (the unifocal camera 31 and the zoom camera 32) is kept.

The focal length obtaining unit 13 obtains the image (the first image g1), which is imaged by the unifocal camera 31 of the stereo camera 300B, and the image (the second image g2), which is imaged by the zoom camera 32 thereof, as the first standard image 1b (FIG. 13) and the first reference image 2b (FIG. 13), respectively (Step S642).

In place of the first calibration object 66, the second calibration object 67 is placed at an unknown imaging distance different from that of the first calibration object 66, and by the control of the CPU 11A, the respective cameras of the stereo camera 300B measure the placed second calibration object 67 once by once (Step S644).

The focal length obtaining unit 13 obtains the image (the first image g1), which is imaged by the unifocal camera 31 of the stereo camera 300B, and the image (the second image g2), which is imaged by the zoom camera 32 thereof, as the second standard image 1c (FIG. 13) and the second reference image 2c (FIG. 13), respectively (Step S646).

Figure 33:
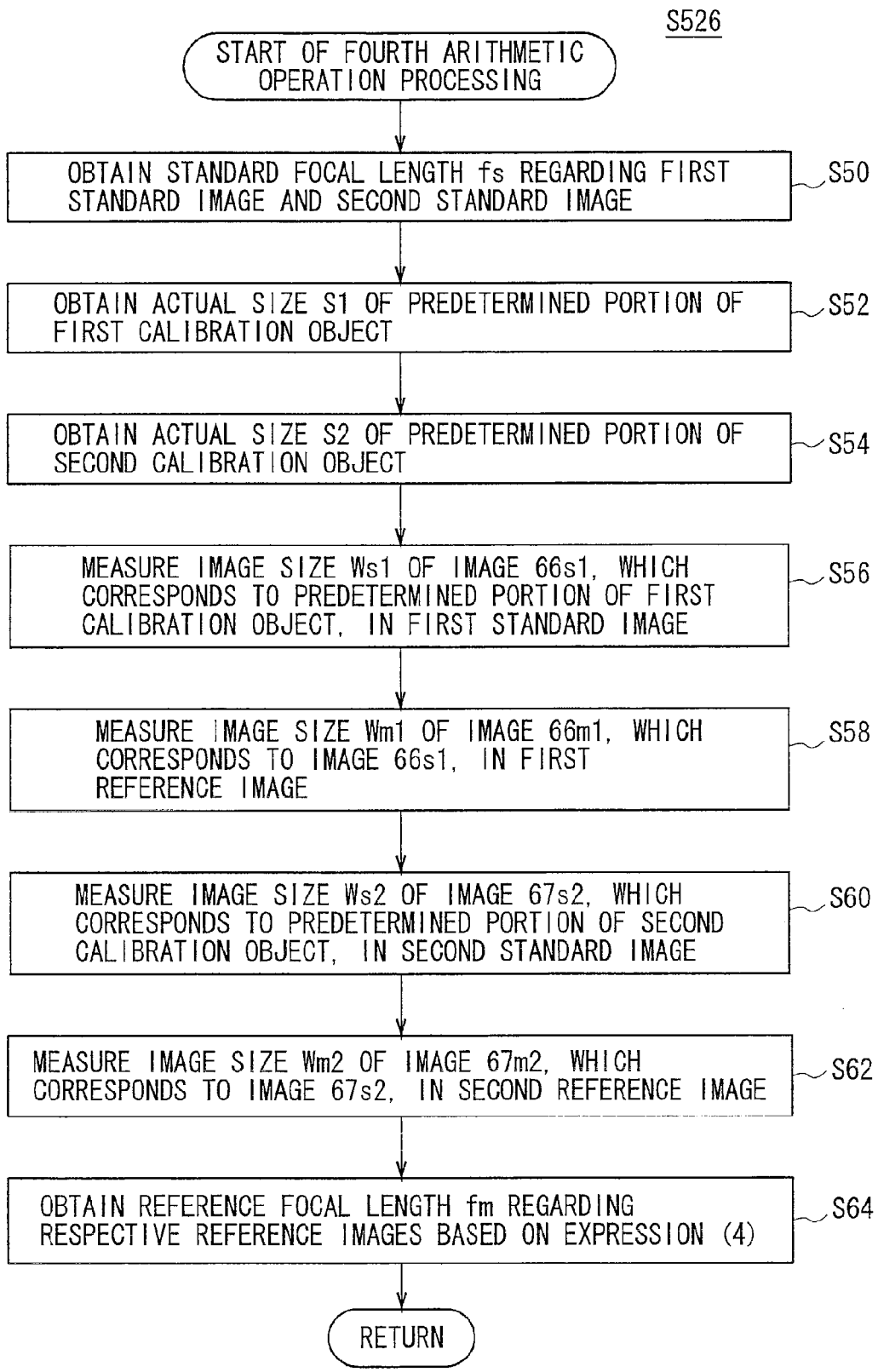
FIG. 33 is a view showing an example of an operation flow related to fourth arithmetic operation processing in the operation flow of FIG. 23.

When the first standard image 1b, the second standard image 1c, the first reference image 2b and the second reference image 2c are obtained, fourth arithmetic operation processing (Step S526 of FIG. 23) is started, and the processing is shifted to step S50 of FIG. 33.

FIG. 33 is a view showing an example of an operation flow related to the fourth arithmetic operation processing (Step S526) in the operation flow of FIG. 23.

First, the focal length obtaining unit 13 obtains the standard focal length fs (FIG. 12, FIG. 13), which is the focal length regarding the first standard image 1b (FIG. 2, FIG. 13) and the second standard image 1c (FIG. 2, FIG. 13), from the field calibrating information storage unit 47a (Step S50).

The focal length obtaining unit 13 obtains the actual size S1 of the predetermined portion of the first calibration object 66 from the field calibrating information storage unit 47a (Step S52).

The focal length obtaining unit 13 obtains the actual size S2 of the predetermined portion of the second calibration object 67 from the field calibrating information storage unit 47a (Step S54).

The focal length obtaining unit 13 measures the image size Ws1 (FIG. 13) of the image 66s1 (FIG. 13), which corresponds to the predetermined portion of the first calibration object 66, in the first standard image 1b (Step S56).

The focal length obtaining unit 13 measures the image size Wm1 (FIG. 13) of the image 66m1 (FIG. 13), which corresponds to the image 66s1, in the first reference image 2b (Step S58).

The focal length obtaining unit 13 measures the image size Ws1 (FIG. 13) of the image 67s2 (FIG. 13), which corresponds to the predetermined portion of the second calibration object 67, in the second standard image 1c (Step S60).

The focal length obtaining unit 13 measures the image size Wm2 (FIG. 13) of the image 67m2 (FIG. 13), which corresponds to the image 67s2, in the second reference image 2c (Step S62).

Based on Expression (4), the focal length obtaining unit 13 obtains the reference focal length fm, which is the focal length regarding the respective reference images (Step S64).

The processing is returned to FIG. 23, and the focal length obtaining unit 13 obtains the obtained reference focal length fm as the focal length of the zoom camera 32 in the stereo camera 300B (Step S536).

Based on Expression (5), the focal length obtaining unit 13 obtains the deviation amount d (FIG. 3) between the optical center 3a and the optical center 3b in the direction of the optical axis 4a (4b).

[Expression 5]

$$d = S1 \times (fm/Wm1 - fs/Ws1) \qquad (5)$$

Note that, in a similar way to the field calibration A, for example, even if, in place of Expression (5), an arithmetic expression is used, in which the distortion correction coefficient, the coefficient for the collimation processing, and the like are appropriately added to Expression (5) in response to the desired obtaining accuracy of the deviation amount d, the usefulness of the present invention is not damaged.

In accordance with the field calibration F, the first calibration object 66 and the second calibration object 67, in which the actual sizes are known, are individually placed at the unknown imaging distances different from each other, and are imaged in the state where the spatial relationships thereof with the imaging system are kept, and the first standard image 1b, the first reference image 2b, the second standard image 1c and the second reference image 2c are obtained.

Then, by using the image sizes Ws1 and Wm1 of the first calibration object 66 in the first standard image 1b and the first reference image 2b, the image sizes Ws2 and Wm2 of the first calibration object 66 in the second standard image 1c and the second reference image 2c, the actual size S1 and the actual size S2, Expression (4), that is, the arithmetic operation processing for scaling the value of the standard focal length fs is performed, whereby the value of the reference focal length fm can be obtained.

Hence, in accordance with the field calibration F, in the stereo camera including the zoom camera, in the case where, with regard to the optical center of the imaging optical system having the known standard focal length fs when the standard image is obtained and the optical center of the imaging optical system having the unknown reference focal length fm when the reference image is obtained, the deviation amount d therebetween is unknown, the reference focal length fm can be obtained at a high speed based on the calibrating data obtainable in a short time under the simple measurement environment that does not require the information of the imaging distance of the calibration object, and then the calibration frequency of the stereo camera at the using site thereof can be enhanced.

Moreover, in accordance with the field calibration F, based on the obtained reference focal length fm, the deviation amount d between the optical center 3a and the optical center 3b in the optical axis direction, which is one of the camera parameters, can be obtained easily at a high speed. Accordingly, the value of the deviation amount d in the parameter-corresponding information t2 is updated by the deviation amount d concerned, and so on, whereby the accuracy of the distance information to be obtained based on the measurement images of the stereo camera can be enhanced.

In accordance with the field calibration F, the unifocal camera 31 and the zoom camera 32 are used for the imaging, and accordingly, the first standard image 1b and the first reference image 2b, and in addition, the second standard image 1c and the second reference image 2c can be individually measured simultaneously or substantially simultaneously.

Hence, it becomes easy to obtain the first standard image 1b and the first reference image 2b, and in addition, the second standard image 1c and the second reference image 2c in the state where the spatial relationships between the first calibration object 66 and the second calibration object 67 and the imaging system (the unifocal camera 31 and the zoom camera 32) are kept, and accordingly, the obtaining accuracy of the reference focal length fm can be enhanced.

Moreover, in accordance with the field calibration F, the unifocal camera 31 and the zoom camera 32 can image the calibration object simultaneously or substantially simultaneously, and accordingly, a moving object can be adopted as the calibration object.

<◎ Operation Flow of Respective Pieces of Processing to be Performed by Information Processing System 100A>

Next, a description is made of an operation flow of the respective pieces of processing to be performed by the information processing system 100A.

⊙ Operation Flow from Calibration to Stereoscopic Image Creation:

FIG. 14 is a view showing an example of an operation flow from calibration of the information processing system 100A to stereoscopic image creation thereof.

As shown in FIG. 14, operations from the calibration of the information processing system 100A to the stereoscopic image creation thereof are performed, for example, by three processing steps.

Step S100: Manufacturing-time calibration of the stereo camera.

Step S200: Field calibration of the drive control value-corresponding information.

Step S300: Creation of the stereoscopic image.

Figure 15:
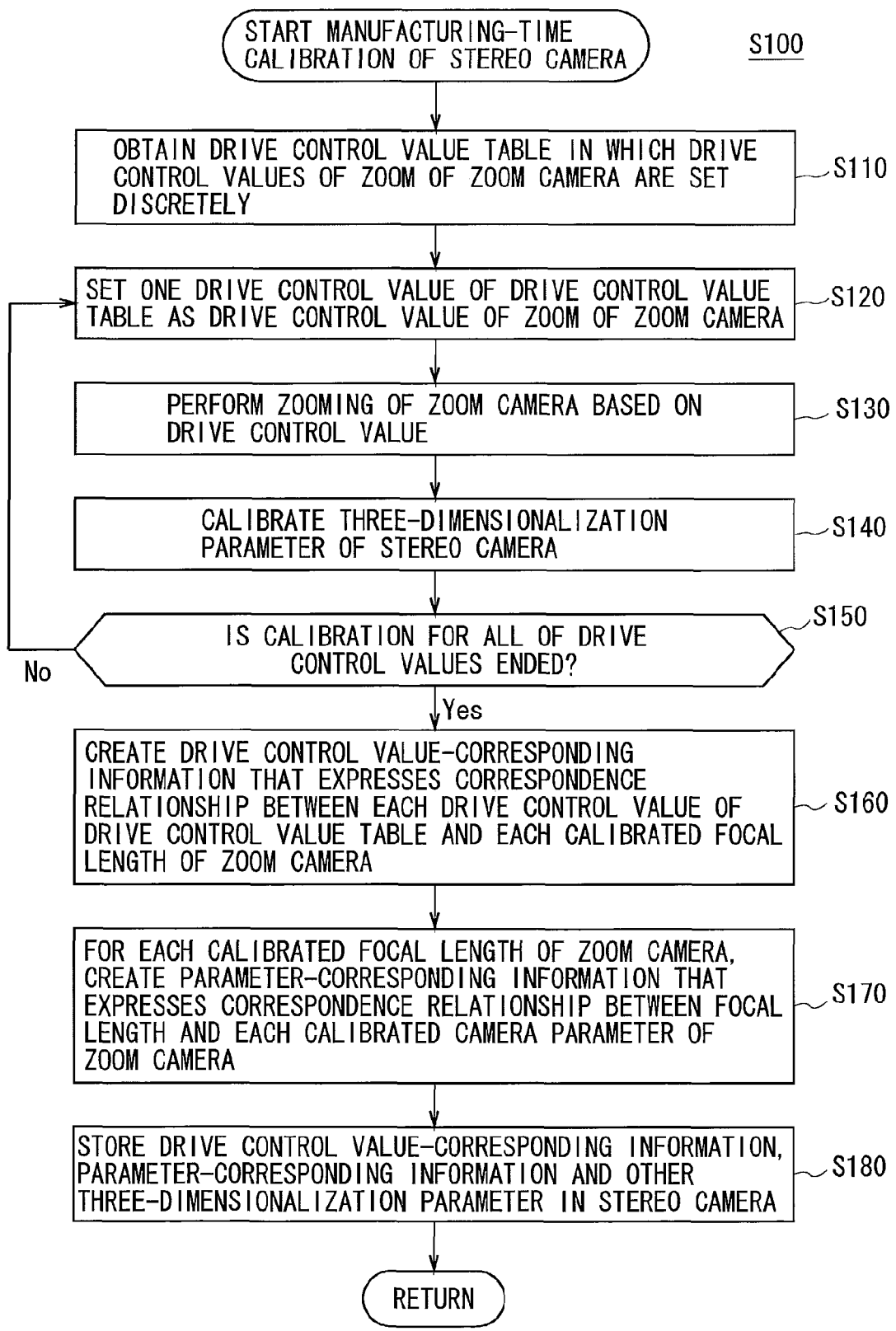
FIG. 15 is a view showing an example of an operation flow of manufacturing time calibration of the stereo camera in the operation flow of FIG. 14.

⊙ Operation Flow of Manufacturing-Time Calibration of Stereo Camera:

FIG. 15 is a view showing an example of an operation flow of manufacturing-time calibration of the stereo camera, which is shown in Step S100 in the operation flow of FIG. 14. In the manufacturing-time calibration of the stereo camera, for example, after the stereo camera 300A (300B) is completed, the stereo camera 300A (300B) is connected to an information processing device for the manufacturing-time calibration, and the calibration of the stereo camera 300A (300B) is performed.

In the operation flow of FIG. 15, the information processing device concerned for the calibration first obtains a drive control value table in which the drive control values concerned of the zoom of the zoom camera 32 are set discretely (Step S110).

The information processing device concerned for the calibration sets one drive control value 51 of the drive control value table as the drive control value of the zoom of the zoom camera 32 (Step S120), and performs the zooming of the zoom camera 32 based on the drive control value 51 (Step S130).

The information processing device concerned for the calibration calibrates the three-dimensionalization parameter of the stereo camera 300A (300B) (Step S140).

The calibration of the camera parameter of the stereo camera 300A (300B) can be performed, for example, by a publicly known camera calibration method using a grid pattern, or the like, which is disclosed in Zhengyou Zhang: "A flexible new technique for camera calibration", IEEE Transactions on Pattern Analysis and Machine Intelligence, Vol. 22. No. 11, pp. 1330-1334, 2000, and the like.

Here, in the zoom camera 32, when a calibrating chart having a uniform pattern is used, for example, in calibration in a wide angle end and a telescopic end in a focal length-variable range, a difference occurs in accuracy of the camera parameters to be estimated since the number of patterns included in the image differs depending on the focal length.

Therefore, in the information processing system 100A, a calibrating chart is used, for example, in which a pattern of a grid or the like is drawn more densely as going toward the center.

A center of the calibrating chart concerned is allowed to coincide in advance with the optical axis of the zoom camera 32, whereby, even if an imaging angle of view of the zoom camera 32 is varied following the zoom drive, an image having substantially similar patterns on the wide angle end and telescopic end of the zoom camera 32 can be imaged on an image in which the calibrating chart is imaged.

Hence, by using the calibrating chart concerned, it becomes possible to suppress an occurrence of a phenomenon that the accuracy of the camera parameter of the zoom camera 32, which is required in the calibration, differs depending on the focal length of the zoom camera 32.

When the calibration is ended for all of the drive control values, the information processing device concerned for the calibration shifts the processing to Step S160, and in the case where the calibration is not ended for all of the drive control values, the information processing device returns the processing to Step S120, and performs the calibration for other drive control values (Step S150).

When the processing is shifted to Step S160, the information processing device concerned for the calibration creates the drive control value-corresponding information t1, which expresses the correspondence relationship between each of the drive control values of the drive control value table and each of the calibrated focal lengths of the zoom camera 32 (Step S160), and in addition, for each of the calibrated focal lengths of the zoom camera 32, creates the parameter-corresponding information t2, which expresses the correspondence relationship between the focal length and each of the calibrated camera parameters of the zoom camera 32 (Step S170).

Next, the information processing device concerned for the calibration stores the drive control value-corresponding information t1, the parameter-corresponding information t2 and other three-dimensionalization parameters in the stereo camera 300A (300B) (Step S180), and ends the manufacturing-time calibration of the stereo camera.

Figure 16:
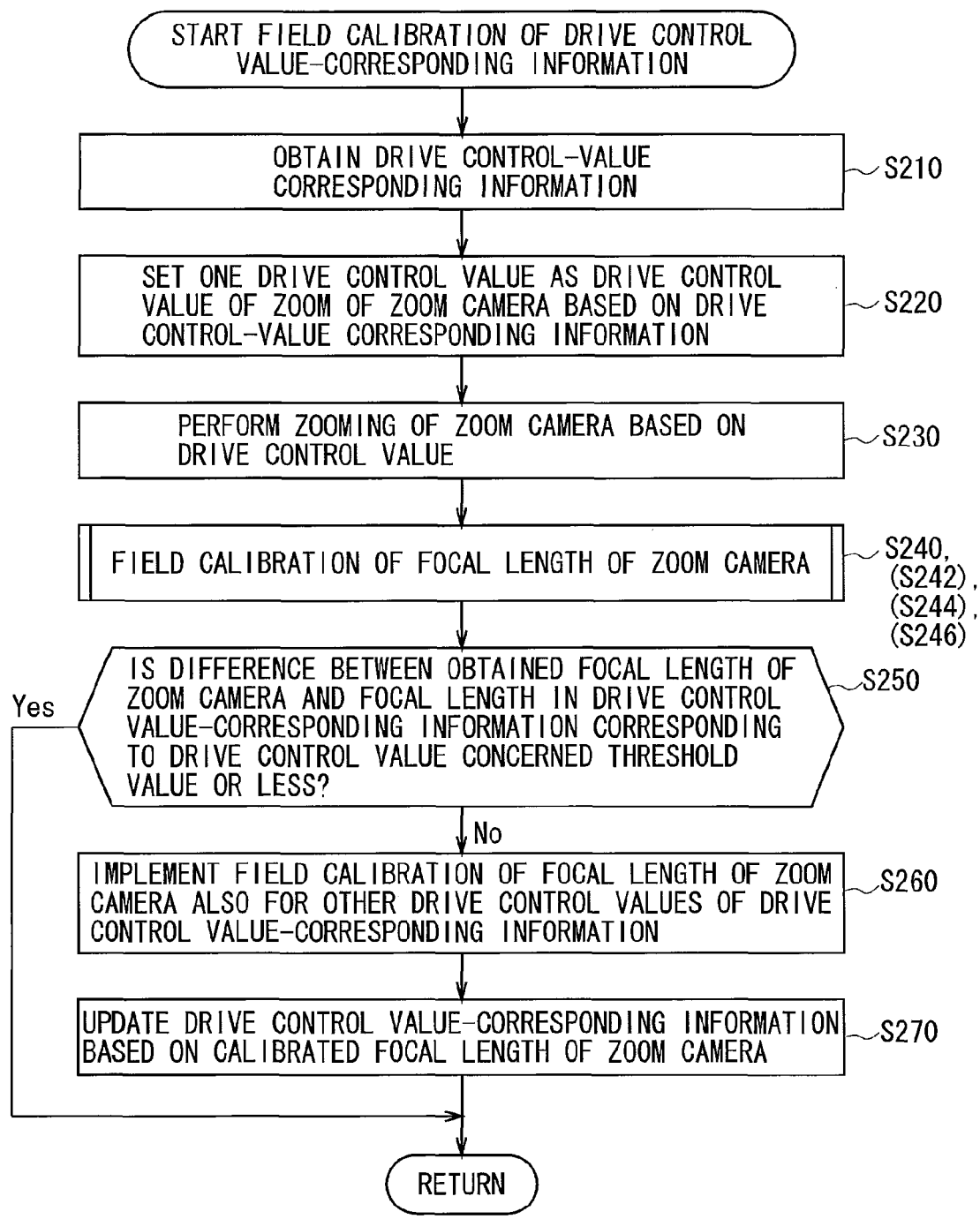
FIG. 16 is a view showing an example of an operation flow of field calibration of drive control value-corresponding information in the operation flow of FIG. 14.

⊙ Operation Flow of Field Calibration of Drive Control Value-Corresponding Information t1:

FIG. 16 is a view showing an example of an operation flow of the field calibration (Step S200) of the drive control value-corresponding information t1 in the operation flow of FIG. 14.

First, the focal length obtaining unit 13 obtains the drive control value-corresponding information t1 from the drive control value-corresponding information storage unit 47b (Step S210).

Moreover, based on the drive control value-corresponding information t1, the zoom control unit 17 sets one drive control value 51 as the drive control value 51 of the zoom of the zoom camera 32 (Step S220), and in addition, based on the drive control value 51, zooms the zoom camera 32 (Step S230).

The focal length obtaining unit 13 performs the already described field calibrations (Step S240, S242, S244, or S246) for the focal length of the zoom camera 32.

The focal length obtaining unit 13 determines whether or not a difference between the obtained focal length of the zoom camera 32 and the focal length in the drive control value-corresponding information t1 corresponding to the drive control value 51 concerned is a predetermined threshold value stored in the storage unit 46 or less (Step S250), and in the case where the difference concerned is the predetermined threshold value or less, determines that a difference between the focal length estimated by the drive control value-corresponding information t1 and the actual focal length is within a permissible range, and ends the field calibration of the drive control value-corresponding information t1.

In the case where the difference concerned exceeds the predetermined threshold value, the focal length obtaining unit 13 determines that the difference between the focal length estimated by the drive control value-corresponding informa-tion t1 and the actual focal length exceeds the permissible range, and shifts the processing to Step S260.

Also for the other drive control values of the drive control value-corresponding information t1, the focal length obtaining unit 13 implements the field calibration of the focal length of the zoom camera 32 (Step S260), and based on the calibrated focal length of the zoom camera 32, updates the drive control value-corresponding information t1 stored in the drive control value-corresponding information storage unit 47b (Step S270), and ends the field calibration of the drive control value-corresponding information t1.

In accordance with the field calibration of the drive control value-corresponding information t1, an error in the relationship between the drive control value 51 and the focal length f2 of the zoom camera 32, which is caused by a change with time, and the like, can be calibrated, and the focal length f2 of the zoom camera 32, which is approximate to a true value, can be obtained based on the drive control value 51.

Figure 17:
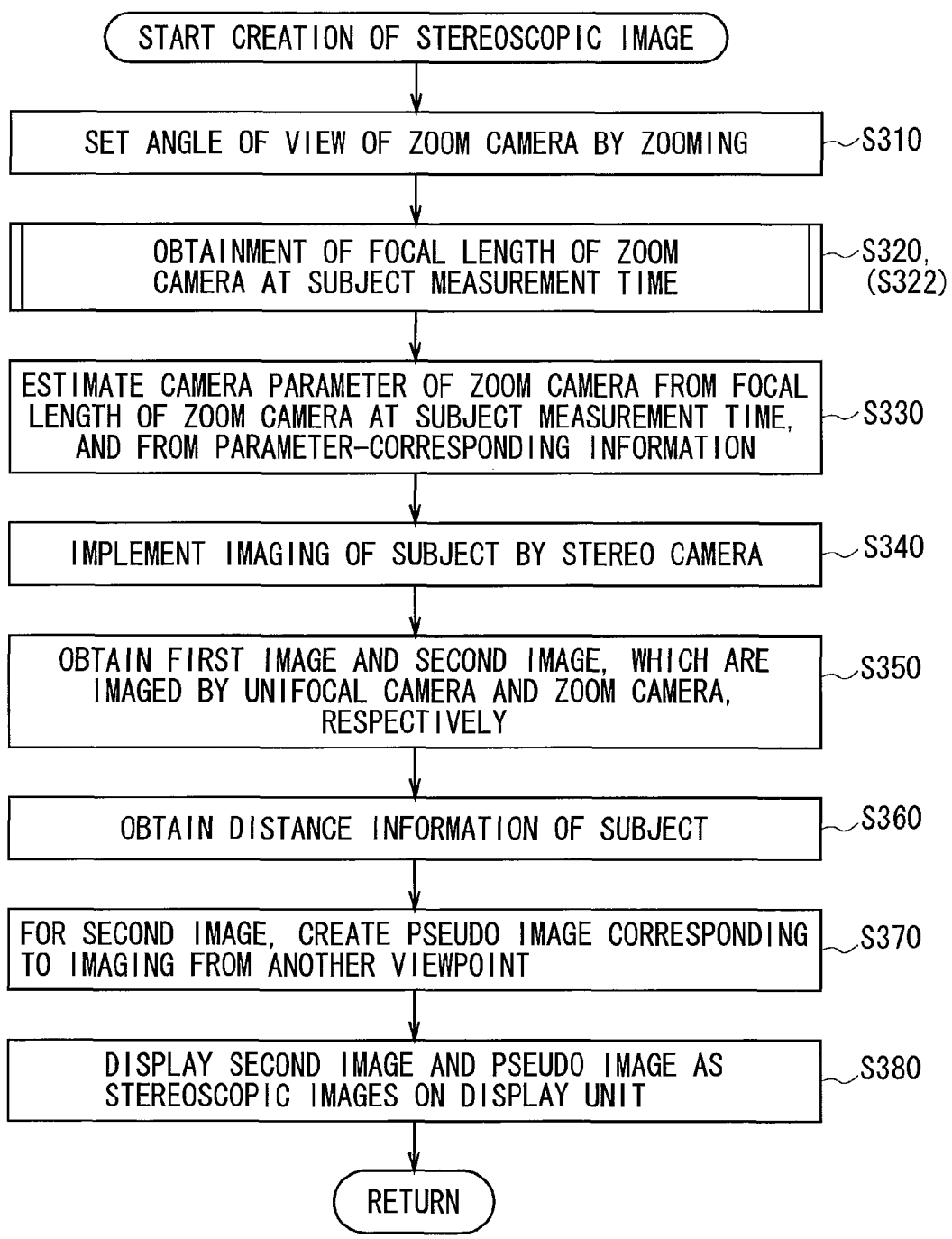
FIG. 17 is a view showing an example of an operation flow of creation of the stereoscopic image in the operation flow of FIG. 14.

⊙ Operation Flow of Creation of Stereoscopic Image:

FIG. 17 is a view showing an example of an operation flow related to the creation (Step S300) of the stereoscopic image in the operation flow of FIG. 14.

First, the zoom control unit 17 sets the angle of view of the zoom camera 32 by zooming the zoom camera 32 (Step S310).

Based on the operation mode set from the operation unit 42 in advance, the focal length obtaining unit 13 performs the obtainment of the focal length of the zoom camera 32 at the subject measurement time in Step S320 or Step S322.

○ Obtainment of Focal Length of Zoom Camera 32 at Subject Measurement Time:

FIG. 18 is a view showing an example of an operation flow related to the obtainment (Step S320) of the focal length of the zoom camera 32 at the subject measurement time in the operation flow of FIG. 17.

When Step S320 of FIG. 17 is started based on the operation mode, the processing is shifted to step S410 of FIG. 18, and the focal length obtaining unit 13 obtains the drive control value 51 of the zoom of the zoom camera 32 from the zoom control unit 17.

The focal length obtaining unit 13 obtains the focal length f2 (FIG. 2) of the zoom camera 32 from the obtained drive control value 51 and the drive control value-corresponding information t1 stored in the drive control value-corresponding information storage unit 47b (S420), and the processing is shifted to Step S330.

FIG. 19 is a view showing an example of an operation flow related to the obtainment (Step S322) of the focal length of the zoom camera 32 at the subject measurement time in the operation flow of FIG. 17.

When Step S322 of FIG. 17 is started based on the operation mode, the processing is shifted to the operation flow of FIG. 19, and in response to characteristic information of the stereo camera and the operation mode set from the operation unit 42, the CPU 11A performs the already described field calibration of the focal length of the zoom camera 32 (Step S240, S242, S244 or S246), and the processing is shifted to Step S330 of FIG. 17.

In this case, the reference focal length fm becomes the focal length f2 of the zoom camera 32 at the subject measurement time.

Returning to FIG. 17, the camera parameter obtaining unit 14 estimates the second camera parameter p2 of the zoom camera 32 from the obtained focal length of the zoom camera 32 at the subject measurement time and from the parameter-corresponding information t2 (Step S330).

○ Estimation of Camera Parameter:

Note that the estimation of the second camera parameter p2 by the focal length obtaining unit 13 is performed, for example, in such a manner as follows.

First, a focal length fa smaller than the focal length f2 of the zoom camera 32 and a focal length fb larger than the focal length f2 are obtained from the focal length information defined in the parameter-corresponding information t2, and a weight W is obtained by Expression (6).

Second camera parameters pa and pb, which correspond to the focal lengths fa and fb, respectively, are obtained based on the parameter-corresponding information t2, and the second camera parameter p2 is estimated by Expression (7) by using the weight w and the second camera parameters pa and pb.

[Expression 6]

$$w = (f2-fa)/(fb-fa) \qquad (6)$$

$$p2 = pa + w \times (pb-pa) \qquad (7)$$

Returning to FIG. 17, when the second camera parameter p2 is estimated, the CPU 11A implements the imaging of the subject by the stereo camera 300A (300B) (Step S340).

When the imaging of the subject is implemented, the focal length obtaining unit 13 obtains the first image g1 and the second image g2, which are imaged by the unifocal camera 31 and the zoom camera 32, respectively (Step S350), and supplies the first image g1 to the three-dimensionalization unit 15, and in addition, supplies the second image g2 to the three-dimensionalization unit 15, the pseudo image creating unit 16 and the display unit 43.

By using the second camera parameter p2 of the zoom camera 32, and the first camera parameter p1 of the unifocal camera 31 and the base length b of the stereo camera, which are obtained from the three-dimensionalization parameter storage unit 47d, the three-dimensionalization unit 15 obtains the distance information 52 of the subject from the first image g1 and the second image g2 by the principle of the triangulation (Step S360).

For the second image g2, the pseudo image creating unit 16 creates the pseudo image 53, which corresponds to the imaging from another viewpoint, based on the distance information 52 (Step S370).

When the pseudo image 53 is created, the CPU 11A displays the second image g2 and the pseudo image 53 as the stereoscopic images on the display unit 43 (Step S380).

Regarding Modification Example

The description has been made above of the embodiment of the present invention; however, the present invention is not limited to the foregoing embodiment, and is modifiable in various ways.

Each of the stereo cameras described in the embodiment includes the unifocal camera 31 and the zoom camera 32; however, for example, even if another zoom camera different from the zoom camera 32 is adopted in place of the unifocal camera 31, and the standard image is imaged by using another zoom camera concerned in the optical state having the known focal distance, the usefulness of the invention of this application is not damaged.

While the invention has been shown and described in detail, the foregoing description is in all aspects illustrative and not restrictive. It is therefore understood that numerous modifications and variations can be devised without departing from the scope of the invention.

EXPLANATION OF SYMBOLS

100A INFORMATION PROCESSING SYSTEM
200A INFORMATION PROCESSING DEVICE
300A, 300B STEREO CAMERA
1a STANDARD IMAGE
1b FIRST STANDARD IMAGE
1c SECOND STANDARD IMAGE
2a REFERENCE IMAGE
2b FIRST REFERENCE IMAGE
2c SECOND REFERENCE IMAGE
3a, 3b OPTICAL CENTER
4a, 4b OPTICAL AXIS
5a, 5b IMAGING ELEMENT
6a, 6b PRINCIPAL RAY
7a, 7b IMAGE CENTER POSITION
9a, 9b IMAGING OPTICAL SYSTEM
Pa, Pb IMAGE POINT
26 DRIVE MECHANISM
31 UNIFOCAL CAMERA
32 ZOOM CAMERA
49 SIGNAL LINE
51 DRIVE CONTROL VALUE
52 DISTANCE INFORMATION
53 PSEUDO IMAGE
54, 55 FEATURE PORTION
54s, 55s, 54m, 55m IMAGE
61 SUBJECT
62, 63, 64, 68 CALIBRATION OBJECT
66 FIRST CALIBRATION OBJECT
67 SECOND CALIBRATION OBJECT
62s, 63s, 64s1, 64s2 IMAGE
66s1, 66s2, 67s2, 68s, 68m IMAGE
62m, 63m, 64m, 64m1, 64m2 IMAGE
D1 IMAGING DISTANCE
M OBJECT POINT
f1 FOCAL LENGTH
f2 FOCAL LENGTH
fs STANDARD FOCAL LENGTH
fm REFERENCE FOCAL LENGTH
Wm, Wm1, Wm2 IMAGE SIZE
Ws, Ws1, Ws2 IMAGE SIZE
S, S1, S2 ACTUAL SIZE
g1 FIRST IMAGE
g2 SECOND IMAGE
b BASE LENGTH
d DEVIATION AMOUNT
p1 FIRST CAMERA PARAMETER
p2 SECOND CAMERA PARAMETER
t1 DRIVE CONTROL VALUE-CORRESPONDING INFORMATION
t2 PARAMETER-CORRESPONDING INFORMATION

The invention claimed is:

1. An information processing device comprising:
an image obtaining unit that, with regard to an object in a state where a spatial relationship with an imaging system is kept, obtains
(a) a standard image in which the object is imaged by an imaging condition having a known standard focal length, and
(b) a reference image in which the object is imaged by an imaging condition having an unknown reference focal length; and
a focal length obtaining unit that obtains a value of said reference focal length by performing arithmetic operation processing for scaling a value of said standard focal length by using information of image sizes of said object in said standard image and said reference image, wherein said standard image includes first and second standard images obtained by individually imaging said object at different imaging distances, and meanwhile, said reference image includes first and second reference images obtained by individually imaging the object at the same imaging distances as the imaging distances in said first and second standard images.

2. An information processing system comprising:
(A) an information processing device comprising:
- an image obtaining unit that, with regard to an object in a state where a spatial relationship with an imaging system is kept, obtains
  - (a) a standard image in which the object is imaged by an imaging condition having a known standard focal length, and
  - (b) a reference image in which the object is imaged by an imaging condition having an unknown reference focal length; and
- a focal length obtaining unit that obtains a value of said reference focal length by performing arithmetic operation processing for scaling a value of said standard focal length by using information of image sizes of said object in said standard image and said reference image,
- wherein said standard image includes first and second standard images obtained by individually imaging said object at different imaging distances, and meanwhile,
- said reference image includes first and second reference images obtained by individually imaging the object at the same imaging distances as the imaging distances in said first and second standard images; and (B) a stereo camera including a first imaging device and a second imaging device, the first imaging device including a first imaging optical system with a fixed focal length, and the second imaging device including a second imaging optical system with a variable focal length, wherein said image obtaining unit obtains said standard image based on imaging by said first imaging device, and in addition, obtains said reference image based on imaging by said second imaging device.

3. The information processing system according claim 2,
wherein a three-dimensionalization parameter for obtaining, from stereo images of a subject imaged by said stereo camera, a three-dimensional shape of said subject includes:
- a first camera parameter regarding said first imaging device; and
- a second camera parameter regarding said second imaging device, and
- a parameter obtaining unit that obtains said second camera parameter based on the reference focal length is further provided.

4. An information processing system comprising:
(A) an information processing device comprising:
- an image obtaining unit that, with regard to an object in a state where a spatial relationship with an imaging system is kept, obtains
  - (a) a standard image in which the object is imaged by an imaging condition having a known standard focal length, and
  - (b) a reference image in which the object is imaged by an imaging condition having an unknown reference focal length; and
- a focal length obtaining unit that obtains a value of said reference focal length by performing arithmetic operation processing for scaling a value of said standard focal length by using information of image sizes of said object in said standard image and said reference image,
- wherein said standard image includes first and second standard images obtained by individually imaging said object at different imaging distances, and meanwhile,
- said reference image includes first and second reference images obtained by individually imaging the object at the same imaging distances as the imaging distances in said first and second standard images; and (B) a stereo camera including a first imaging device and a second imaging device, the first imaging device including a first imaging optical system with a fixed focal length, and the second imaging device including a second imaging optical system with a variable focal length, wherein said image obtaining unit obtains said standard image and said reference image from said second imaging device.

* * * * *